(12) United States Patent
Chen

(10) Patent No.: US 11,709,415 B2
(45) Date of Patent: Jul. 25, 2023

(54) WAVELENGTH CONVERSION MODULE AND PROJECTION DEVICE

(71) Applicant: Coretronic Corporation, Hsin-Chu (TW)

(72) Inventor: Fa-Chih Chen, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 0 days.

(21) Appl. No.: 18/078,995

(22) Filed: Dec. 11, 2022

(65) Prior Publication Data

US 2023/0194969 A1 Jun. 22, 2023

(30) Foreign Application Priority Data

Dec. 21, 2021 (CN) .......................... 202111571112.9

(51) Int. Cl.
*G03B 21/20* (2006.01)
(52) U.S. Cl.
CPC .................................. *G03B 21/204* (2013.01)
(58) Field of Classification Search
CPC ........ F21V 29/502; F21V 29/83; F21V 25/10; G03B 21/204; G03B 21/16
See application file for complete search history.

(56) References Cited

U.S. PATENT DOCUMENTS

| 10,309,617 B2 | 6/2019 | Chang et al. |
| 2017/0099467 A1 | 4/2017 | Egawa |
| 2017/0357150 A1* | 12/2017 | Ueda ..................... G02B 26/008 |
| 2019/0313065 A1* | 10/2019 | Kitade ................ G11B 33/1466 |
| 2022/0206372 A1* | 6/2022 | Tsai ...................... G03B 21/208 |
| 2022/0206373 A1* | 6/2022 | Hsu ....................... G02B 26/008 |
| 2022/0413372 A1* | 12/2022 | Chen ..................... G03B 21/204 |

FOREIGN PATENT DOCUMENTS

| CN | 106681092 | 8/2018 |
| CN | 109116667 | 5/2021 |

* cited by examiner

*Primary Examiner* — Jong-Suk (James) Lee
*Assistant Examiner* — Glenn Zimmerman
(74) *Attorney, Agent, or Firm* — JCIPRNET

(57) ABSTRACT

A wavelength conversion module including a substrate, a wavelength conversion layer and at least one wing is provided. The substrate has a wavelength conversion area, a non-wavelength conversion area and at least one through hole. The through hole penetrates through the substrate and is located in the non-wavelength conversion area. The wavelength conversion layer is disposed in the wavelength conversion area of the substrate. The wing is disposed in the non-wavelength conversion area of the substrate. When the substrate reaches a first temperature range, the wing closes the through hole. When the substrate reaches a second temperature range, at least one airflow channel is formed between the wing and the through hole. The wavelength conversion module of the invention and the projection device using the same effectively reduce a temperature of the wavelength conversion module, and thus have better reliability.

20 Claims, 24 Drawing Sheets

WAVELENGTH CONVERSION MODULE AND PROJECTION DEVICE

CROSS-REFERENCE TO RELATED APPLICATION

This application claims the priority benefit of China application serial no. 202111571112.9 filed on Dec. 21, 2021. The entirety of the above-mentioned patent application is hereby incorporated by reference herein and made a part of this specification.

BACKGROUND

Technical Field

The invention relates to an optical module and a projection device, and particularly relates to a wavelength conversion module and a projection device using the same.

Description of Related Art

In a device of a solid-state light source laser (SSI Laser) projector, a phosphor wheel is located on a transmission path of an excitation light beam of a light source module, and a blue laser light beam emitted by a blue laser light source is projected to a light conversion area of the phosphor wheel to excite a yellow converted light beam to achieve a purpose of synthesizing white light. Generally, the structure of the phosphor wheel may be additionally assembled with a counterweight ring for the use of subsequent dynamic balance correction. However, the counterweight ring and a substrate are usually connected by an adhesive, so that heat energy accumulated at a central part of a substrate is hard to be transferred to the counterweight ring due to blocking of the adhesive, and the central part of the substrate is covered by the counterweight ring and cannot directly contact the air, which results in accumulation of heat energy. In addition, thermal expansion amounts of the counterweight ring and the substrate are different due to a temperature difference, which further leads to deformation of the phosphor wheel. Although the prior art has a technique of using an additional heat dissipation structure to solve the problem of heat energy accumulation at the center part of the substrate, the additional heat dissipation structure not only increases a weight and increases a loading of a motor, but also affects dynamic balance and noise.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a wavelength conversion module, which has better reliability.

The invention is directed to a projection device including the aforementioned wavelength conversion module, which has better projection quality and product competitiveness.

Other objects and advantages of the invention may be further illustrated by the technical features broadly embodied and described as follows.

In order to achieve one or a portion of or all of the objects or other objects, an embodiment of the invention provides a wavelength conversion module including a substrate, a wavelength conversion layer and at least one wing. The substrate has a wavelength conversion area, a non-wavelength conversion area and at least one through hole. The through hole penetrates through the substrate and is located in the non-wavelength conversion area. The wavelength conversion layer is disposed in the wavelength conversion area of the substrate. The wing is disposed in the non-wavelength conversion area of the substrate. When the substrate reaches a first temperature range, the wing closes the through hole. When the substrate reaches a second temperature range, at least one airflow channel is formed between the wing and the through hole.

In an embodiment of the invention, a thermal expansion coefficient of the wing is different from a thermal expansion coefficient of the substrate.

In an embodiment of the invention, the thermal expansion coefficient of the wing is less than the thermal expansion coefficient of the substrate.

In an embodiment of the invention, the wavelength conversion module further includes a clamping element, including a main body and the wing formed integrally. The wing is located on one side surface of the main body and extends out of the main body. The wing is embedded into the through hole to close the through hole.

In an embodiment of the invention, the substrate has a first surface, the wing has a second surface, and the first surface and the second surface are located on a same plane.

In an embodiment of the invention, the through hole is a plurality of through holes, and the through holes are communicated with each other. The wing is a plurality of wings, and the plurality of wings respectively extend out of the main body along different radial directions of the main body, and the plurality of wings are connected with each other.

In an embodiment of the invention, the wavelength conversion module further includes an adhesive layer disposed between the main body of the clamping element and the non-wavelength conversion area of the substrate. The clamping element is fixed on the substrate through the adhesive layer.

In an embodiment of the invention, the wavelength conversion module further includes a clamping element including a main body and the wing formed integrally. The wing is connected to an edge of the main body, and the wing and the main body are located on different planes. The wing is embedded into the through hole to close the through hole.

In an embodiment of the invention, the substrate has a first surface, the wing has a second surface, and the first surface and the second surface are located on a same plane.

In an embodiment of the invention, the through hole is a plurality of through holes, and the through holes are separated from each other. The wing is a plurality of wings, and the plurality of wings respectively extend along different radial directions of the main body, and the plurality of wings are separated from each other.

In an embodiment of the invention, the wavelength conversion module further includes an adhesive layer disposed between the main body of the clamping element and the non-wavelength conversion area of the substrate. The clamping element is fixed on the substrate through the adhesive layer.

In an embodiment of the invention, the wavelength conversion module further includes a clamping element and an adhesive layer. The clamping element is disposed in the non-wavelength conversion area of the substrate and covers a part of the wing. The clamping element and the substrate are coaxially arranged. The adhesive layer is disposed between the clamping element and the non-wavelength conversion area of the substrate, where the clamping element is fixed on the substrate through the adhesive layer.

In an embodiment of the invention, a material of the wing is different from a material of the clamping element and a material of the substrate.

In an embodiment of the invention, the wavelength conversion module further includes a driving assembly and an adhesive layer. The driving assembly is connected to the substrate, and drives the substrate to rotate while taking a rotation shaft of the driving assembly as a central axis. The wing is embedded into the through hole from one side of the substrate relatively adjacent to the driving assembly to close the through hole. The adhesive layer is disposed between the rotation shaft of the driving assembly and the non-wavelength conversion area of the substrate, where the driving assembly is fixed on the substrate through the adhesive layer.

In an embodiment of the invention, the substrate has a first surface, the wing has a second surface, and the first surface and the second surface are located on different planes. The wing covers the through hole to close the through hole.

In an embodiment of the invention, an area of the wing is larger than an area of the through hole.

In an embodiment of the invention, the substrate includes a plurality of turbulent portions protruding out of or recessed into the non-wavelength conversion area.

In an embodiment of the invention, a material of the wing includes metal, non-metal or a composite material of metal and non-metal.

In an embodiment of the invention, a material of the substrate includes metal, non-metal or a composite material of metal and non-metal.

In order to achieve one or a portion of or all of the objects or other objects, an embodiment of the invention provides a projection device including an illumination system, a light valve and a projection lens. The illumination system is configured to provide an illumination light beam, where the illumination system includes a light source module and a wavelength conversion module. The light source module is configured to provide an excitation light beam. The wavelength conversion module is disposed on a transmission path of the excitation light beam to convert the excitation light beam into an illumination light beam. The wavelength conversion module includes a substrate, a wavelength conversion layer and at least one wing. The substrate has a wavelength conversion area, a non-wavelength conversion area and at least one through hole. The through hole penetrates through the substrate and is located in the non-wavelength conversion area. The wavelength conversion layer is disposed in the wavelength conversion area of the substrate. The wing is disposed in the non-wavelength conversion area of the substrate. When the substrate reaches a first temperature range, the wing closes the through hole. When the substrate reaches a second temperature range, at least one airflow channel is formed between the wing and the through hole. The light valve is disposed on the transmission path of the illumination light beam to convert the illumination light beam into an image light beam. The projection lens is disposed on a transmission path of the image light beam to project the image light beam out of the projection device.

Based on the above descriptions, the embodiments of the invention have at least one of following advantages or effects. In the design of the wavelength conversion module of the invention, the wing is disposed in the non-wavelength conversion area of the substrate, where when the substrate reaches the first temperature range (such as a low temperature), the wing closes the through hole, and when the substrate reaches the second temperature range (such as a high temperature), the airflow channel is formed between the wing and the through hole. In other words, the airflow channel formed between the wing and the through hole increases a turbulence effect, so as to effectively reduce a temperature of the wavelength conversion module to make the wavelength conversion module achieving better reliability. Moreover, since the wavelength conversion module of the invention may dynamically and automatically adjust spaces between the wing and the through hole in different temperature ranges, the noise felt by a user may be reduced under a premise of satisfying a heat dissipation requirement. In addition, the projection device using the wavelength conversion module of the invention may have better projection quality and product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
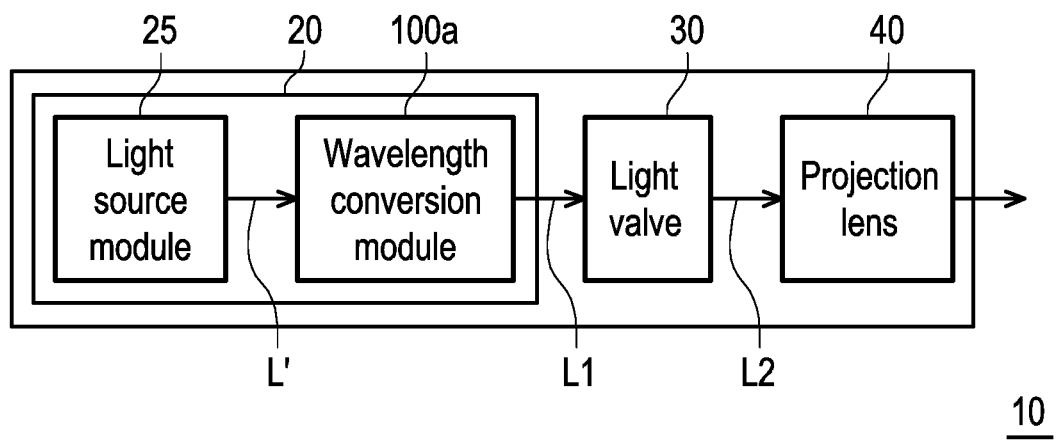
FIG. 1 is a schematic diagram of a projection device according to an embodiment of the invention.

FIG. 1 is a schematic diagram of a projection device according to an embodiment of the invention. Referring first to FIG. 1, in the embodiment, a projection device 10 includes an illumination system 20, a light valve 30, and a projection lens 40. The illumination system 20 is configured to provide an illumination light beam L1, where the illumination system 20 includes a light source module 25 and a wavelength conversion module 100a. The light source module 25 is configured to provide an excitation light beam L'. The wavelength conversion module 100a is disposed on a transmission path of the excitation light beam L' to convert the excitation light beam L' into the illumination light beam L1. The light valve 30 is disposed on a transmission path of the illumination light beam L1, and is configured to convert the illumination light beam L1 into an image light beam L2. The projection lens 40 is disposed on a transmission path of the image light beam L2, and is configured to project the image light beam L2 out of the projection device 10. The wavelength conversion module 100a is, for example, a phosphor wheel, which periodically enters the transmission path of the excitation light beam L'.

In detail, the light source module 25 used in the embodiment is, for example, a laser diode (LD), such as a laser diode bank. To be specific, according to an actual design, any light source that meets a volume demand may used for implementation, which is not limited by the invention. The light valve 30 is, for example, a reflective light modulator such as a liquid crystal on silicon panel (LCoS panel), a digital micro-mirror device (DMD), etc. In an embodiment, the light valve 30 is, for example, a transmissive light modulator such as a transparent liquid crystal panel, an electro-optical modulator, a magneto-optic modulator, an acousto-optic modulator (AOM), etc., but the pattern and type of the light valve 30 are not limited by the embodiment. Regarding a method that the light valve 30 converts the illumination light beam L1 into the image light beam L2, since enough instructions, recommendations, and implementation descriptions of steps and implementation of the method may be learned from common knowledge of the art, detailed description thereof is not repeated. In addition, the projection lens 40 includes, for example, an optical lens or a combination of a plurality of optical lenses having refracting powers, for example, various combinations of non-planar lenses such as a biconcave lens, a biconvex lens, a concavo-convex lens, a convexo-concave lens, a plano-convex lens, a plano-concave lens, etc. In an embodiment, the projection lens 40 may also include a plano-optical lens, which converts the image light beam L2 coming from the light valve 30 into a projection light beam in a reflective or transmissive manner and projects the projection light beam out of the projection device 10. The pattern and type of the projection lens 40 is not limited by the embodiment.

Figure 2A:
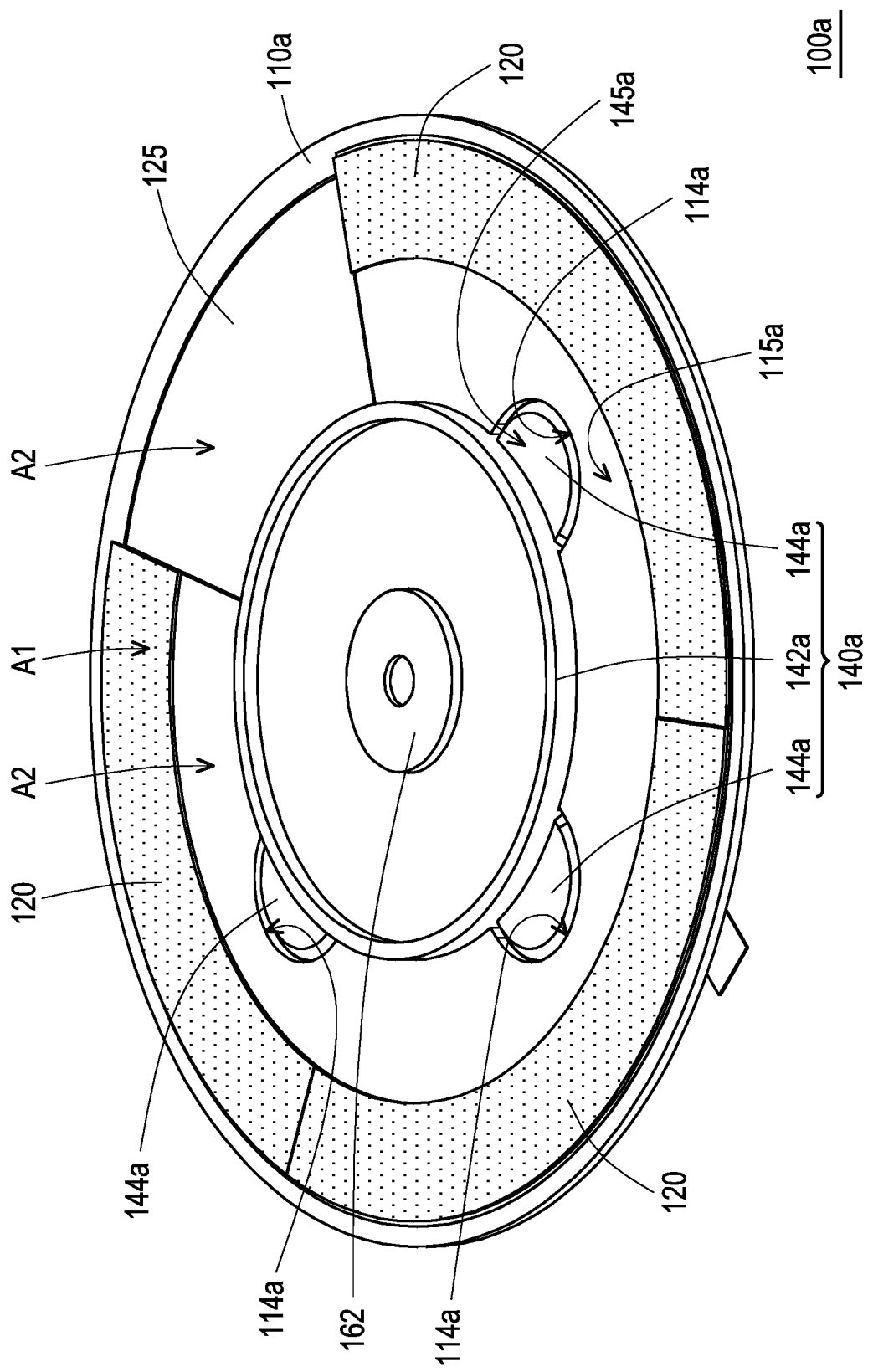
FIG. 2A is a schematic three-dimensional view of a wavelength conversion module of the projection device of FIG. 1.
Figure 2B:
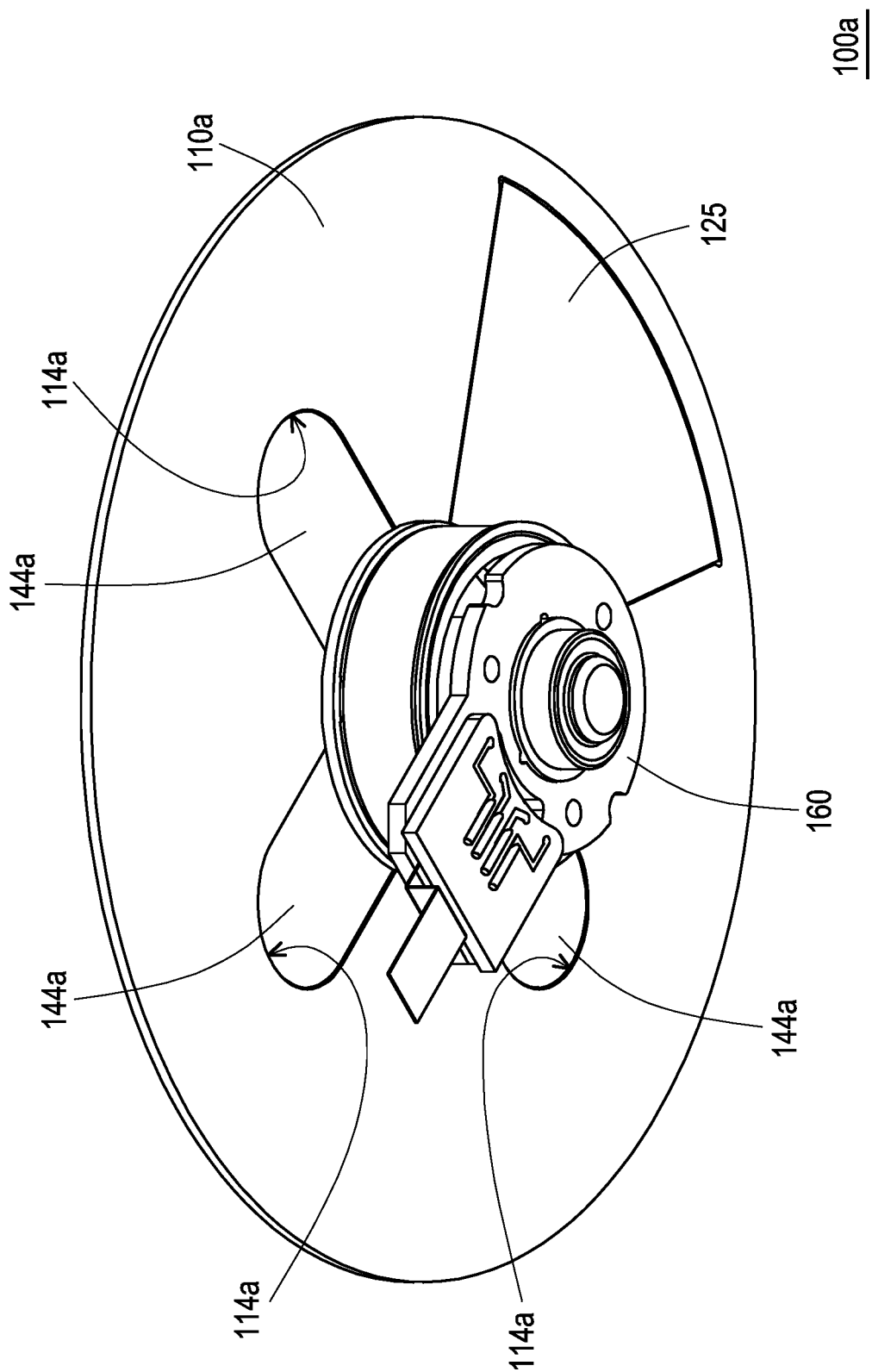
FIG. 2B is a schematic three-dimensional view of the wavelength conversion module of FIG. 2A from another viewing angle.
Figure 2C:
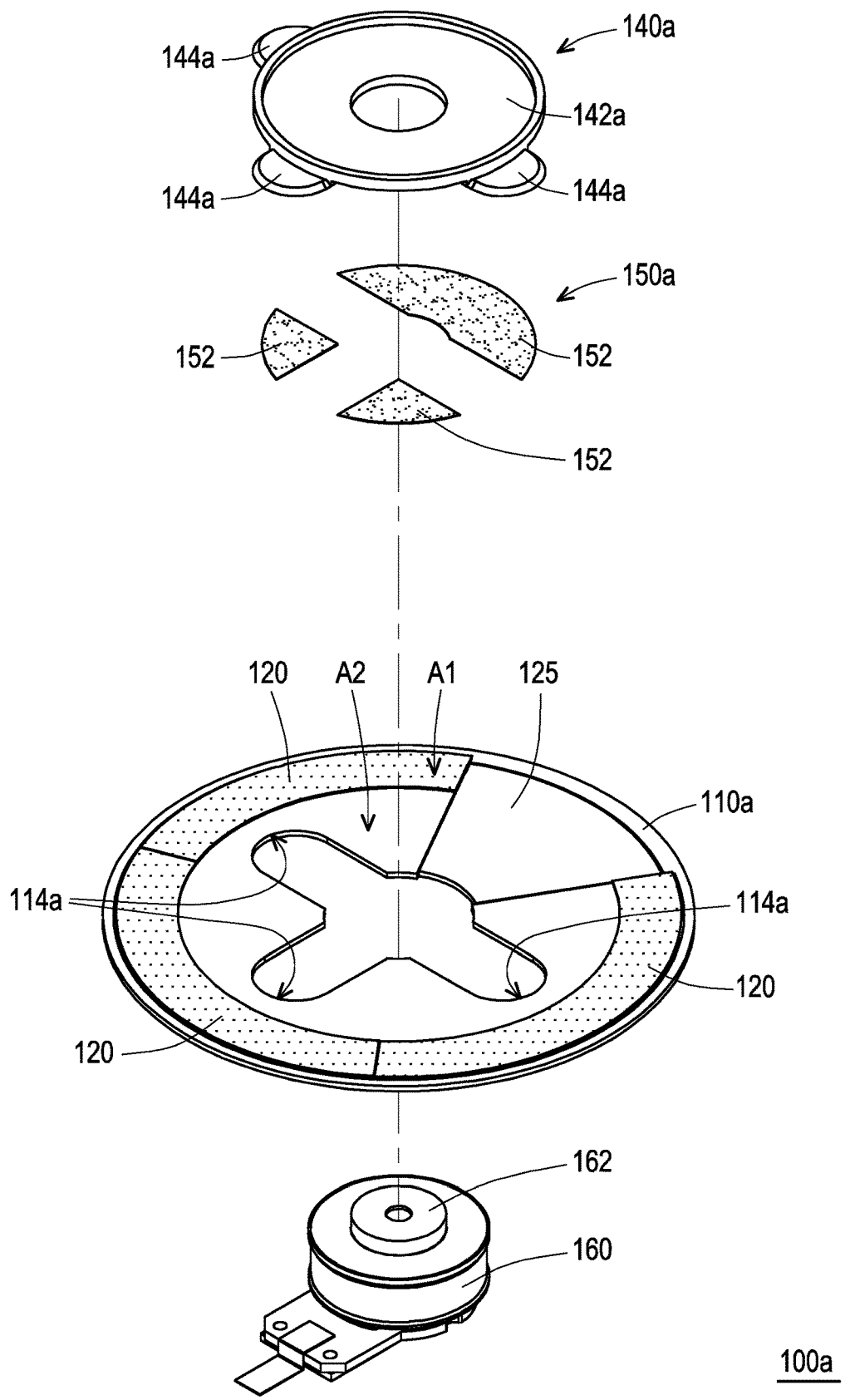
FIG. 2C is a schematic three-dimensional exploded view of the wavelength conversion module of FIG. 2A.
Figure 2D:
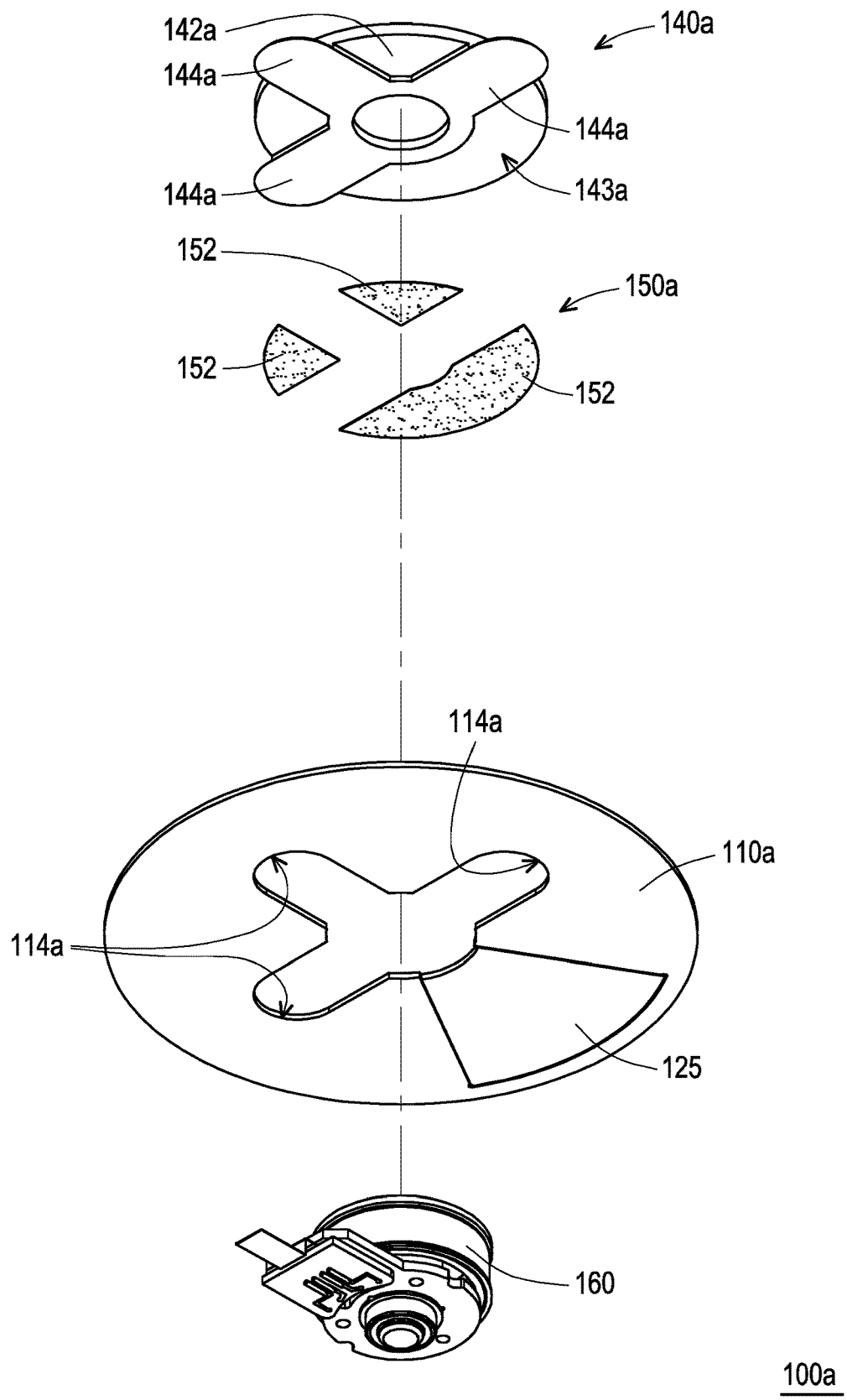
FIG. 2D is a schematic three-dimensional exploded view of the wavelength conversion module of FIG. 2A from another viewing angle.
Figure 2E:
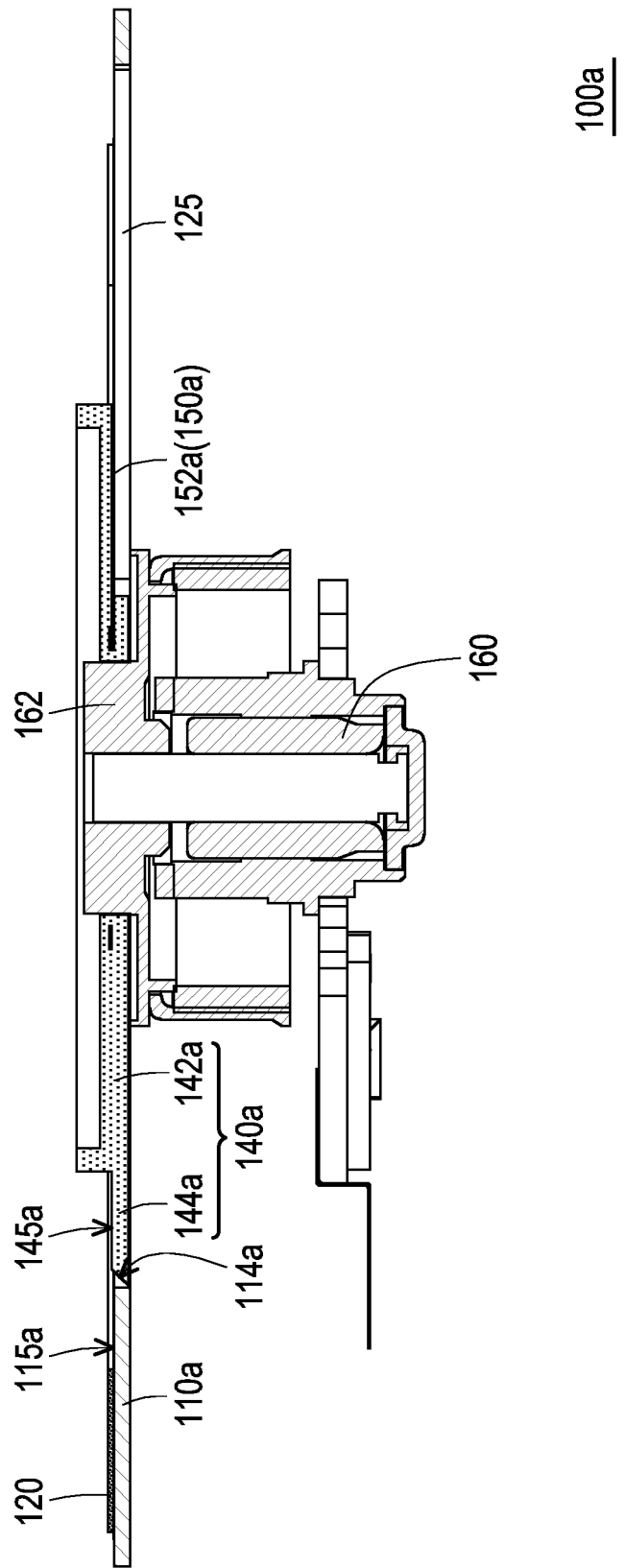
FIG. 2E is a schematic cross-sectional view of the wavelength conversion module of FIG. 2A.
Figure 2F:
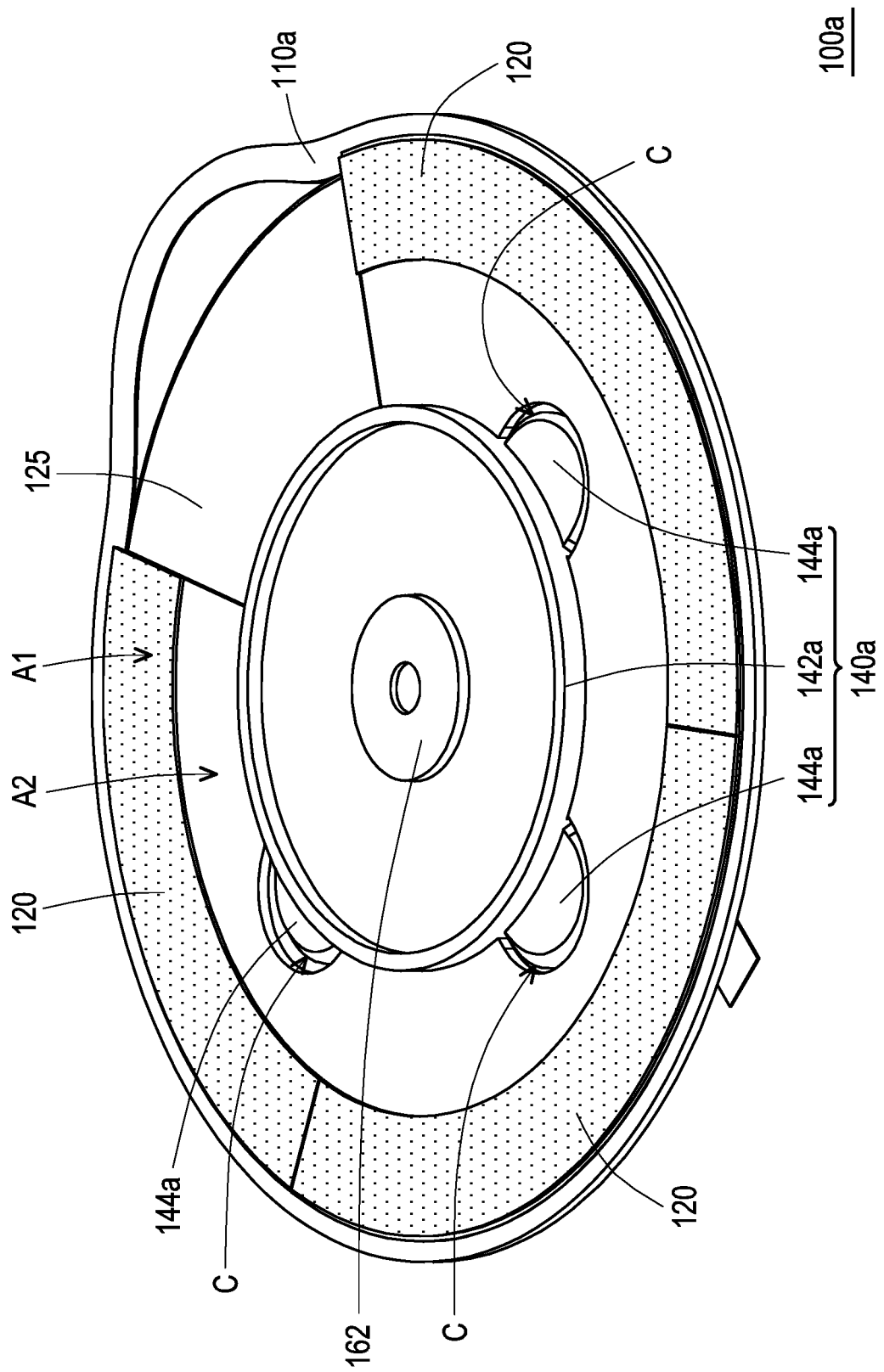
FIG. 2F is a schematic three-dimensional view of the wavelength conversion module of FIG. 2A when a substrate reaches a second temperature range.

FIG. 2A is a schematic three-dimensional view of a wavelength conversion module of the projection device of FIG. 1. FIG. 2B is a schematic three-dimensional view of the wavelength conversion module of FIG. 2A from another viewing angle. FIG. 2C is a schematic three-dimensional exploded view of the wavelength conversion module of FIG. 2A. FIG. 2D is a schematic three-dimensional exploded view of the wavelength conversion module of FIG. 2A from another viewing angle. FIG. 2E is a schematic cross-sectional view of the wavelength conversion module of FIG. 2A. FIG. 2F is a schematic three-dimensional view of the wavelength conversion module of FIG. 2A when the substrate reaches a second temperature range.

Referring to FIG. 2A, FIG. 2B, FIG. 2C and FIG. 2D, in the embodiment, the wavelength conversion module 100a includes a substrate 110a, a wavelength conversion layer 120, and at least one wing (three wings 144a are schematically shown). The substrate 110a has a wavelength conversion area A1, a non-wavelength conversion area A2 and at least one through hole (three through holes 114a are schematically shown). The through holes 114a penetrate through the substrate 110a and are located in the non-wavelength conversion area A2, where the through holes 114a communicate with each other. A material of the substrate 110a is, for example, metal, non-metal, or a composite material of metal and non-metal. The wavelength conversion layer 120 is disposed in the wavelength conversion area A1 of the substrate 110a, where the wavelength conversion layer 120 is, for example, a phosphor material, for converting a wavelength of the excitation light beam U of FIG. 1 to respectively generate converted light beams of different wavelengths. Furthermore, the wavelength conversion module 100a of the embodiment further includes a transparent plate 125, where the transparent plate 125 is disposed in the non-wavelength conversion area A2 of the substrate 110a to define a disk shape together with the substrate 110a. When the substrate 110a rotates, the wavelength conversion layer 120 in the wavelength conversion area A1 and the transparent plate 125 in the non-wavelength conversion area A2 may be driven and sequentially moved to the transmission path of the excitation light beam U shown in FIG. 1. When the transparent plate 125 located in the non-wavelength conversion area A2 enters the transmission path of the excitation light beam L', the excitation light beam L' penetrates through the transparent plate 125 and is transmitted to the light valve 30.

Particularly, in the embodiment, the wings 144a are disposed in the non-wavelength conversion area A2 of the substrate 110a. In detail, the wavelength conversion module 100a of the embodiment further includes a clamping element 140a, where the clamping element 140a includes a main body 142a and the wings 144a formed integrally, where the wings 144a are connected to each other. The wings 144a are located on a side surface 143a of the main body 142a, and respectively extend out of the main body 142a along different radial directions of the main body 142a. Namely, the wings 144a protrude from the side surface 143a of the main body 142a, and a material of the main body 142a is the same as that of the wings 144a. The clamping element 140a may be manufactured through computer numerical control (CNC) processing, so as to effectively reduce the production cost, where the material of the wings 144a is, for example, metal, non-metal or a composite material of metal and non-metal, but the invention is not limited thereto.

When the substrate 110a reaches a first temperature range, such as a normal temperature/low temperature state, and the temperature is 20 degrees to 90 degrees, the wings 144a are embedded into the through holes 114a of the substrate 110a to close the through holes 114a. At this moment, referring to FIG. 2A and FIG. 2E at the same time, the substrate 110a has a first surface 115a, and the wing 144a has a second surface 145a, and the first surface 115a and the second surface 145a are located on a same plane. Namely, in the first temperature range, the wings 144a and the substrate 110a are preferably in a close state or near close state, where the wings 144a are used to fill the through holes 114a, so that the substrate 110a that originally forms an incomplete circle or an incomplete ring due to the through holes 114a is changed into a complete circle or a complete ring.

Then, referring to FIG. 2A and FIG. 2F at the same time, when the substrate 110a reaches a second temperature range, such as a high temperature state, and the temperature is 90 degrees to 170 degrees, since a thermal expansion coefficient of the wings 144a is different from that of the substrate 110a, preferably, the thermal expansion coefficient of the wings 144a is less than the thermal expansion coefficient of the substrate 110a, at least one airflow channel (three airflow channels C are schematically shown) is formed between the wings 144a and the through holes 114a of the substrate 110a. Namely, the airflow channels C may be formed between the wings 144a and the through holes 114a due to a difference of thermal expansions, thereby increasing a turbulence effect, so as to effectively reduce the temperature of the wavelength conversion module 100a, and thereof the wavelength conversion module 100a may have better reliability.

It should be noted that the accumulated heat energy generated due to irradiation of laser light and performance of the light wavelength conversion during usage of the wavelength conversion module 100a causes the substrate 110a and the clamping element 140a to produce thermal expansion. However, since amounts of thermal expansions of the substrate 110a and the clamping element 140a are different (due to a difference in thermal expansion coefficient, or a difference in temperature caused by the difference in heat energy accumulation), gaps between the through holes 114a of the substrate 110a and the embedded wings 144a are enlarged to form the airflow channels C communicating a front surface and a back surface of the substrate 110a. Further, when the temperature is higher, a difference in deformation amount of the substrate 110a and the clamping element 140a is larger, and the gaps between the through holes 114a and the embedded wings 144a are larger, so that the wavelength conversion module 100a of the embodiment may have a better heat dissipation effect under a higher temperature.

In addition, referring to FIG. 2C, FIG. 2D and FIG. 2E again, the wavelength conversion module 100a of the embodiment further includes an adhesive layer 150a including a plurality of adhesive portions 152 disposed between the main body 142a of the clamping element 140a and the non-wavelength conversion area A2 of the substrate 110a. The clamping element 140a is fixed on the substrate 110a through the adhesive layer 150a.

Moreover, the wavelength conversion module 100a of the embodiment further includes a driving assembly 160, which drives the substrate 110a to rotate while taking a rotation shaft 162 of the driving assembly 160 as a central axis. The clamping element 140a is disposed around the rotation shaft 162 by perpendicular to the rotation shaft 162 of the driving assembly 160. The substrate 110a and the clamping element 140a are respectively disposed coaxially with the driving assembly 160. The driving assembly 160 is, for example, a motor, but the invention is not limited thereto. Certainly, in other embodiments that are not shown, the wavelength conversion module may also not have a driving assembly, i.e., the wavelength conversion module is non-rotary and does not rotate, which still belongs to the protection scope of the invention.

In brief, the wings 144a of the embodiment are disposed in the non-wavelength conversion area A2 of the substrate 110a. In the first temperature range (for example, a low temperature), the wings 144a close the through holes 114a of the substrate 110a, and in the second temperature range (for example, a high temperature), the airflow channels C are formed between the wings 144a and the through holes 114a due to the difference in thermal deformation between the wings 144a and the substrate 110a. Namely, the airflow channels C formed between the wings 144a and the through holes 114a increase the turbulence effect, and effectively reduce the thermal energy transferred from the substrate 110a to the main body 142a of the clamping element 140a, so as to effectively reduce the temperature of the wavelength conversion module 100a, and therefore the wavelength conversion module 100a may have better reliability. Furthermore, since the wavelength conversion module 100a of the embodiment may dynamically and automatically adjust spaces between the wings 144a and the through holes 114a in different temperature ranges, the noise felt by the user may be reduced under the premise of satisfying a heat dissipation requirement. In addition, the projection device 10 using the wavelength conversion module 100a of the embodiment may have better projection quality and product competitiveness.

It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 3A:
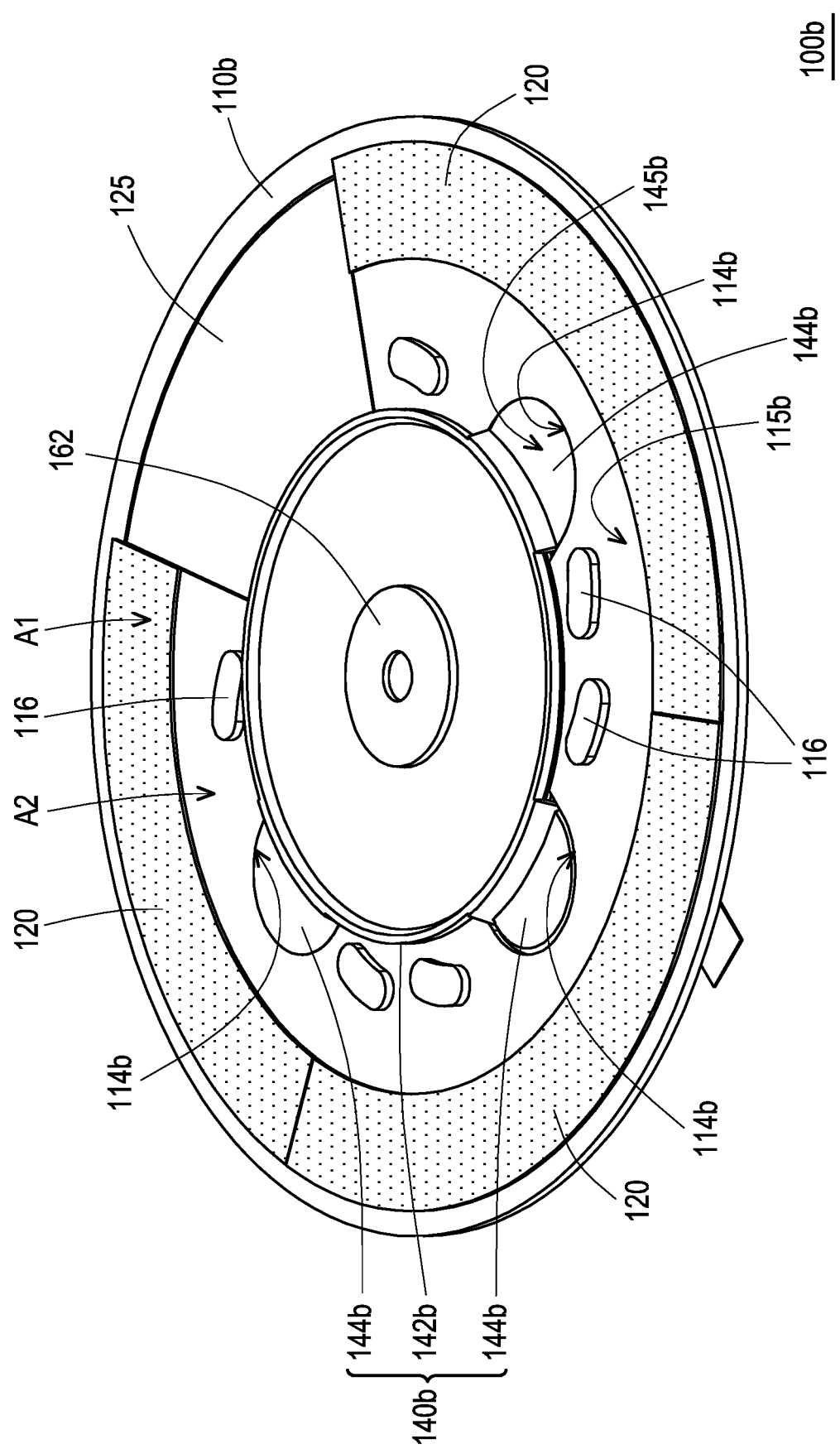
FIG. 3A is a schematic three-dimensional view of a wavelength conversion module according to an embodiment of the invention.
Figure 3B:
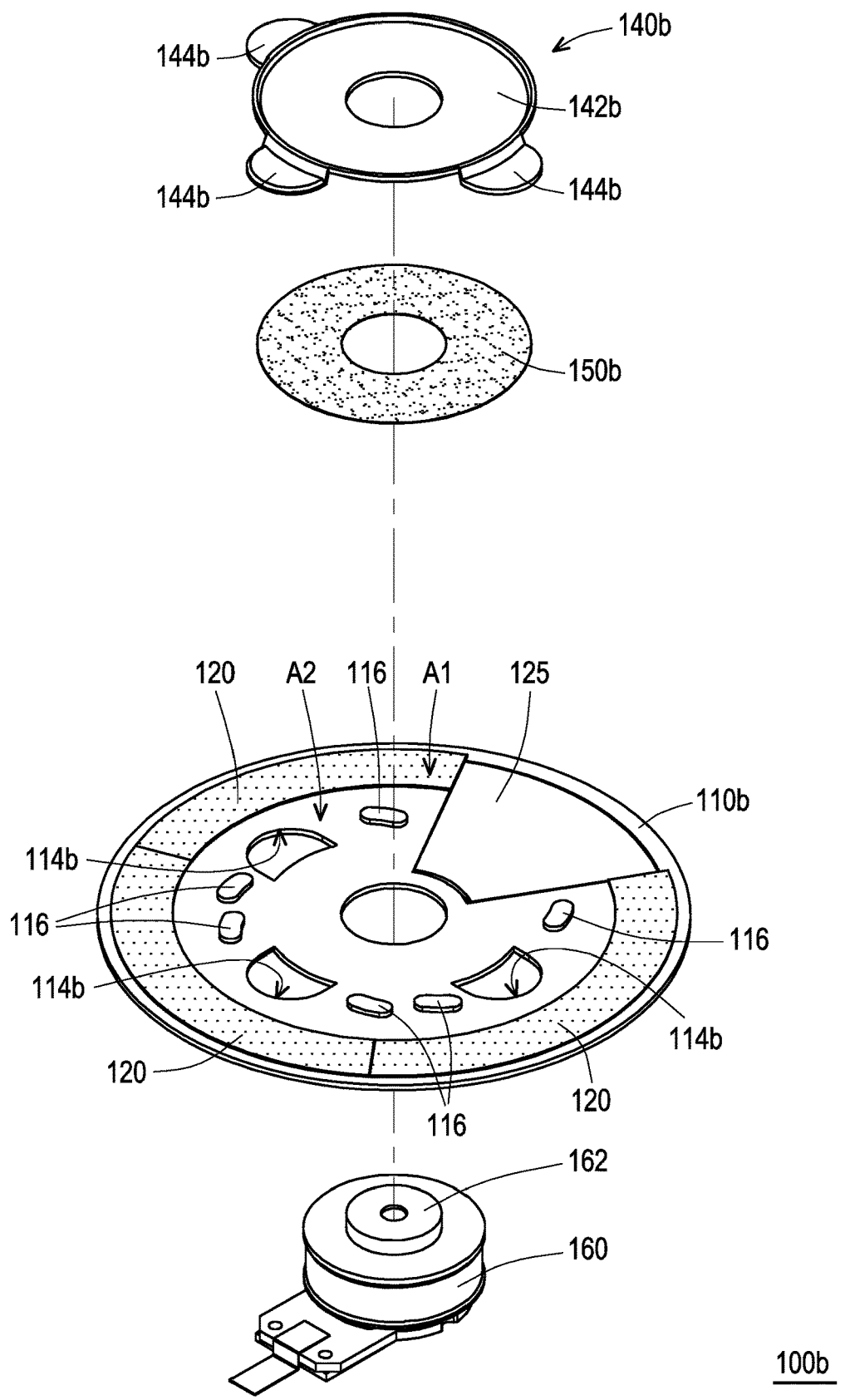
FIG. 3B is a schematic three-dimensional exploded view of the wavelength conversion module of FIG. 3A.
Figure 3C:
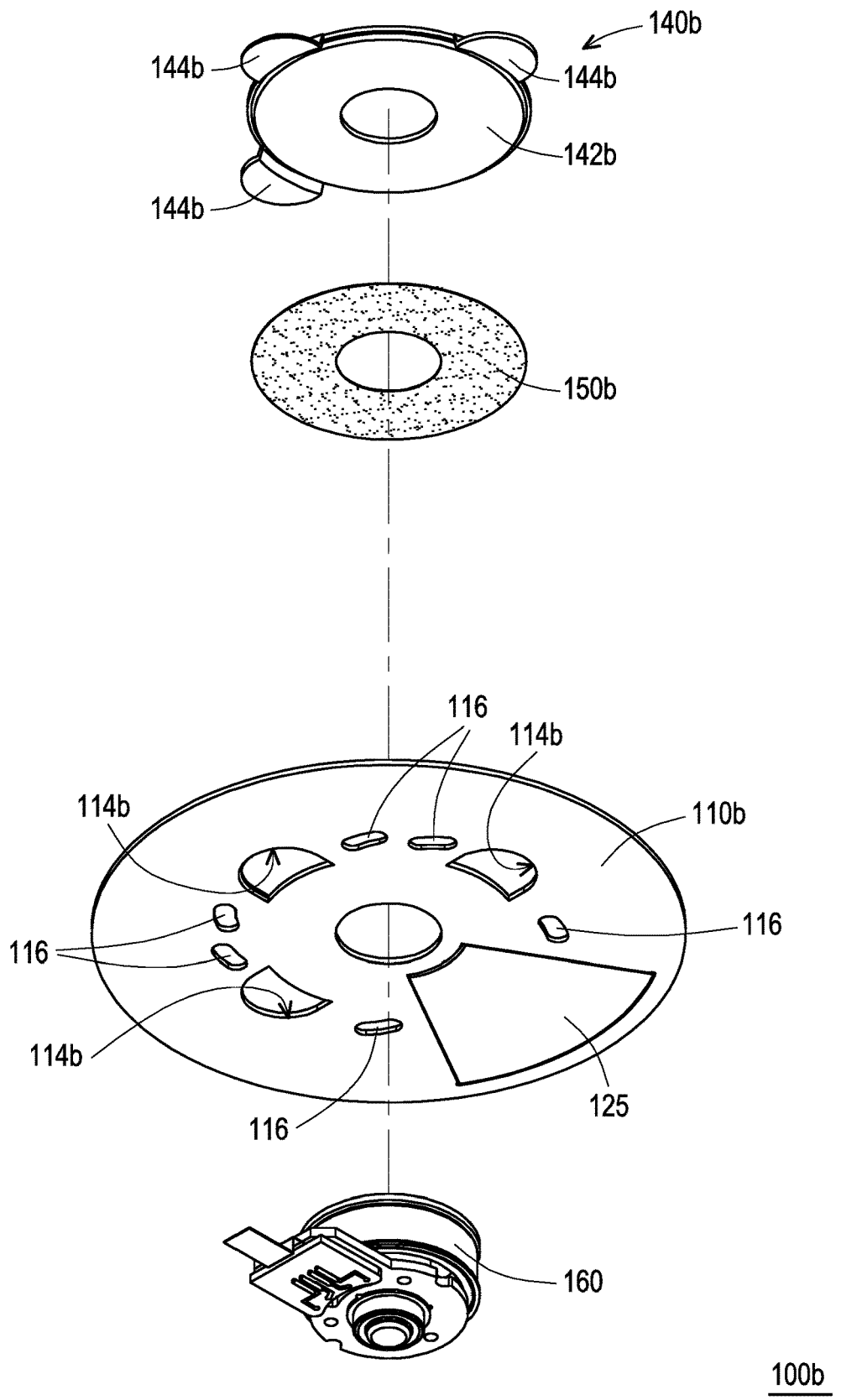
FIG. 3C is a schematic three-dimensional exploded view of the wavelength conversion module of FIG. 3A from another viewing angle.
Figure 3D:
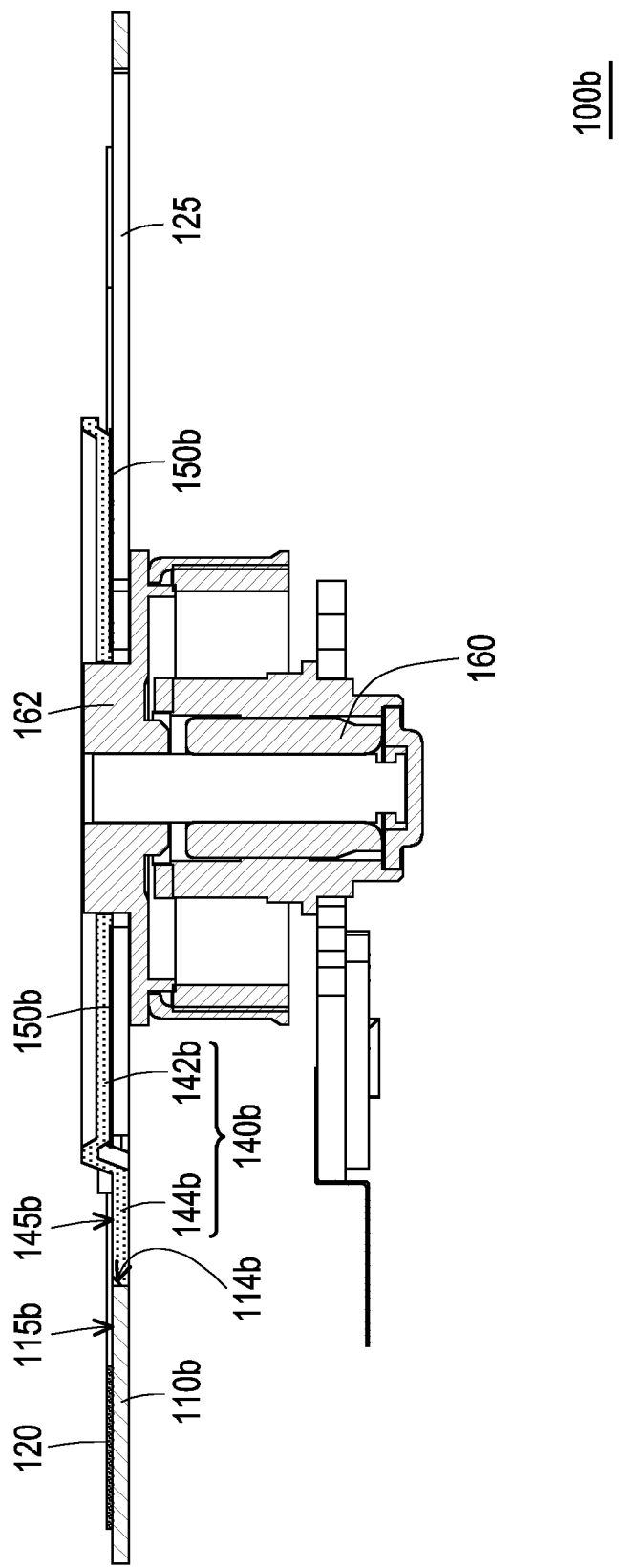
FIG. 3D is a schematic cross-sectional view of the wavelength conversion module of FIG. 3A.

FIG. 3A is a schematic three-dimensional view of a wavelength conversion module according to an embodiment of the invention. FIG. 3B is a schematic three-dimensional exploded view of the wavelength conversion module of FIG. 3A. FIG. 3C is a schematic three-dimensional exploded view of the wavelength conversion module of FIG. 3A from another viewing angle. FIG. 3D is a schematic cross-sectional view of the wavelength conversion module of FIG. 3A. Referring to FIG. 2A and FIG. 3A, a wavelength conversion module 100b of the embodiment is similar to the wavelength conversion module 100a of FIG. 2A, and a difference there between is that in the embodiment, a structure of a wing 144b of a clamping element 140b is different from the structure of the wing 144a of the clamping element 140a of FIG. 2A, and a structure of a substrate 110b is also different from the structure of the substrate 110a of FIG. 2A.

In detail, referring to FIG. 3A, FIG. 3B, FIG. 3C and FIG. 3D, in the embodiment, the clamping element 140b includes a main body 142b and wings 144b formed integrally, where the wings 144b are separated from each other and connected to an edge of the main body 142b, and the wings 144b respectively extend along different radial directions of the main body 142b. As shown in FIG. 3D, the wings 144b and the main body 142b are located on different planes, where the clamping element 140b may be made by a punching process, so as to effectively reduce the production cost. The clamping element 140b is fixed on the substrate 110b through an adhesive layer 150b. When the substrate 110b reaches a first temperature range, for example, a normal temperature/low temperature, and the temperature is 20 degrees to 90 degrees, the wings 144b are embedded into the through holes 114b of the substrate 110b to close the through holes 114b. At this time, a first surface 115b of the substrate 110b and a second surface 145b of the wing 144b are located on a same plane. When the substrate 110b reaches a second temperature range, such as a high temperature state, when the temperature is 90° C. to 170° C., since the substrate 110b and the wings 144b have different thermal expansions, airflow channels are formed between the wings 144b and the through holes 114b of the substrate 110b (referring to FIG. 2F), which may increase the turbulence effect and effectively reduce the temperature of the wavelength conversion module 100b.

Moreover, the substrate 110b of the embodiment includes a plurality of turbulent portions 116, where the turbulent portions 116 are separated from each other and protruded out or recessed into the non-wavelength conversion area A2. The heat energy in the center of the substrate 110b may be dissipated due to a larger surface area formed by the turbulent portions 116, and the turbulent portions 116 may also make the airflow turbulence on an airflow guiding path more turbulent, thereby improving the heat dissipation effect. A material of the turbulent portions 116 may be the same as a material of the substrate 110b, or the turbulent portions 116 may be formed by coating colloid on the non-wavelength conversion area A2 of the substrate 110b, which all belong to the scope of the invention.

Figure 4A:
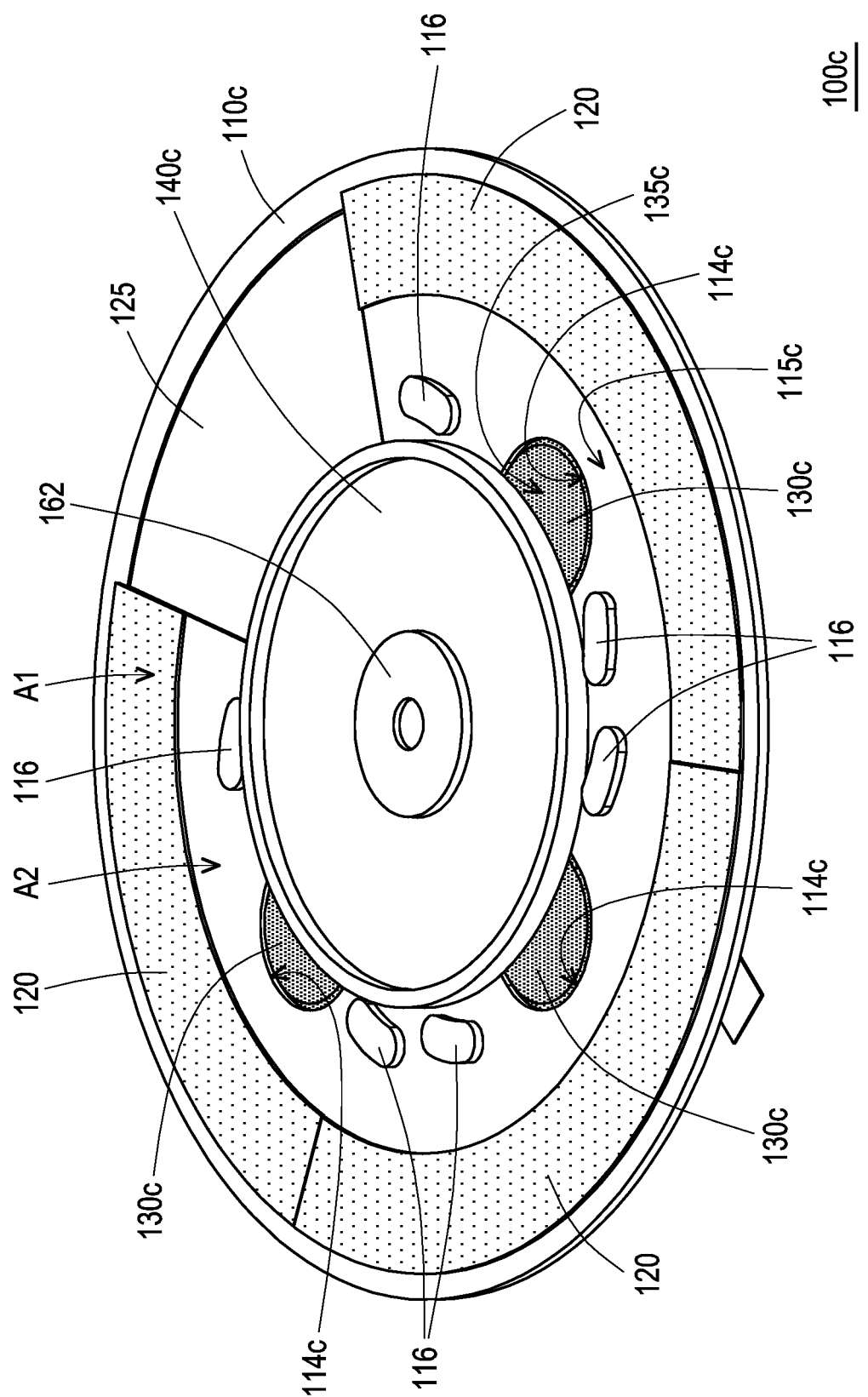
FIG. 4A is a schematic three-dimensional view of a wavelength conversion module according to another embodiment of the invention.
Figure 4B:
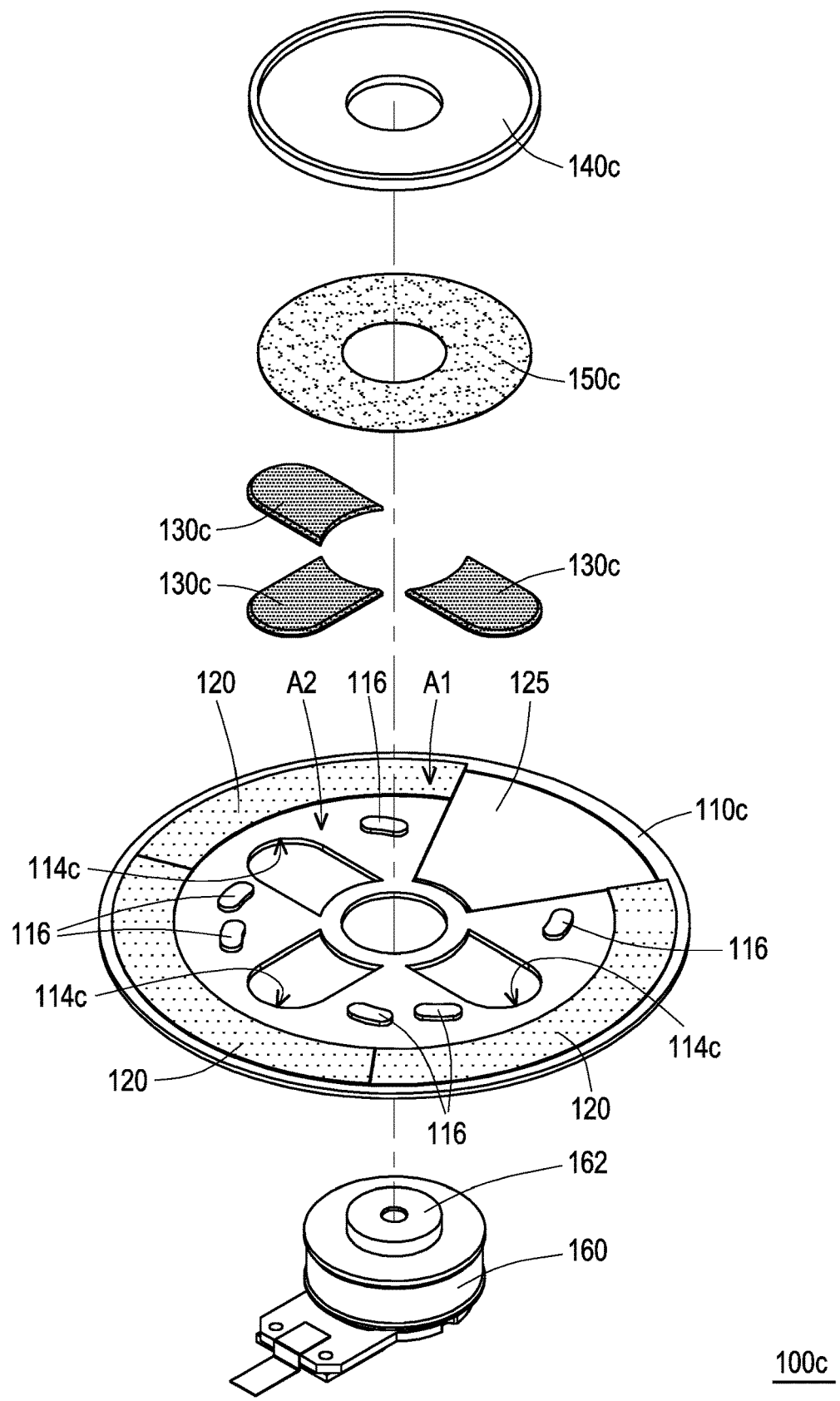
FIG. 4B is a schematic three-dimensional exploded view of the wavelength conversion module of FIG. 4A.
Figure 4C:
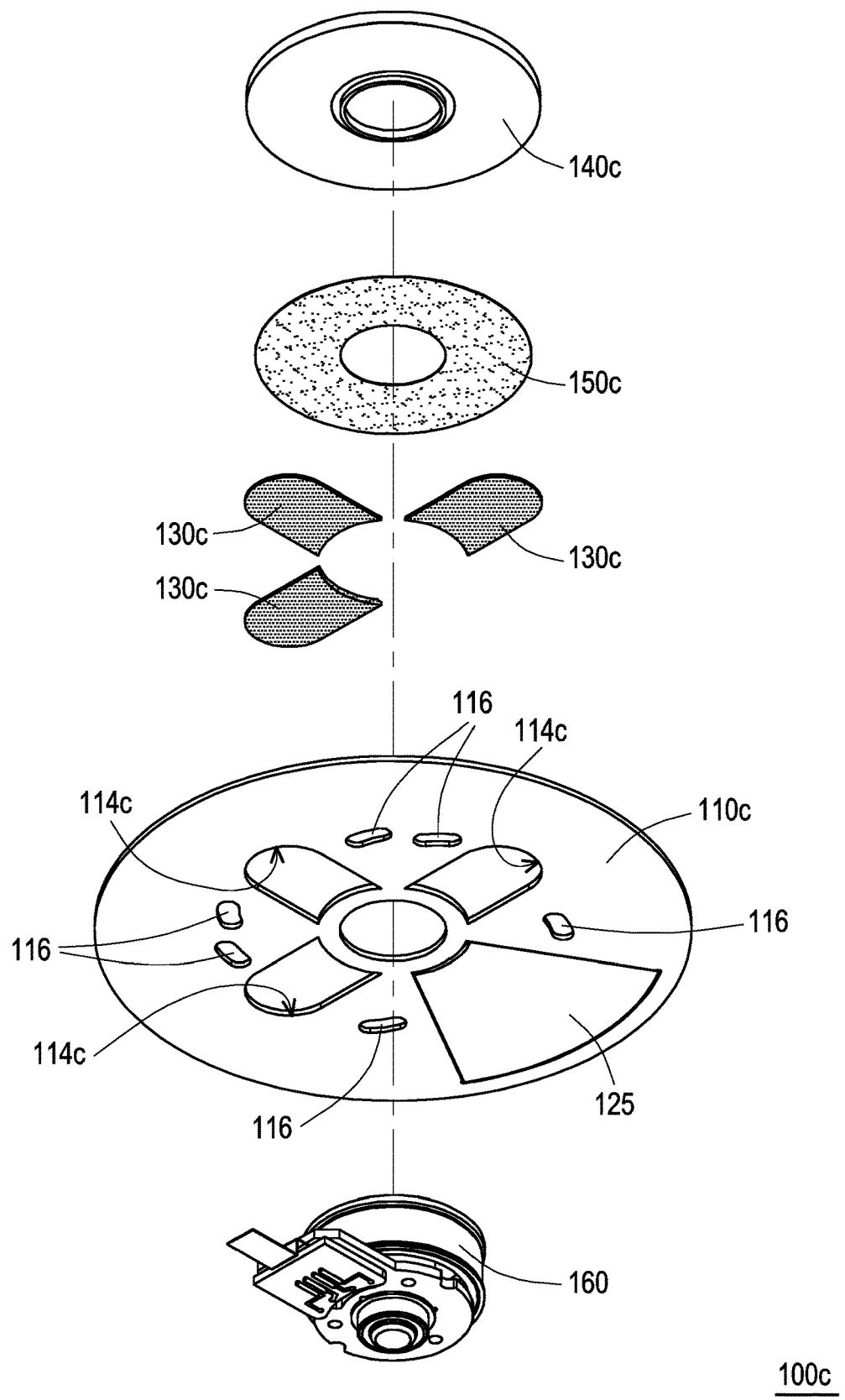
FIG. 4C is a schematic three-dimensional exploded view of the wavelength conversion module of FIG. 4A from another viewing angle.
Figure 4D:
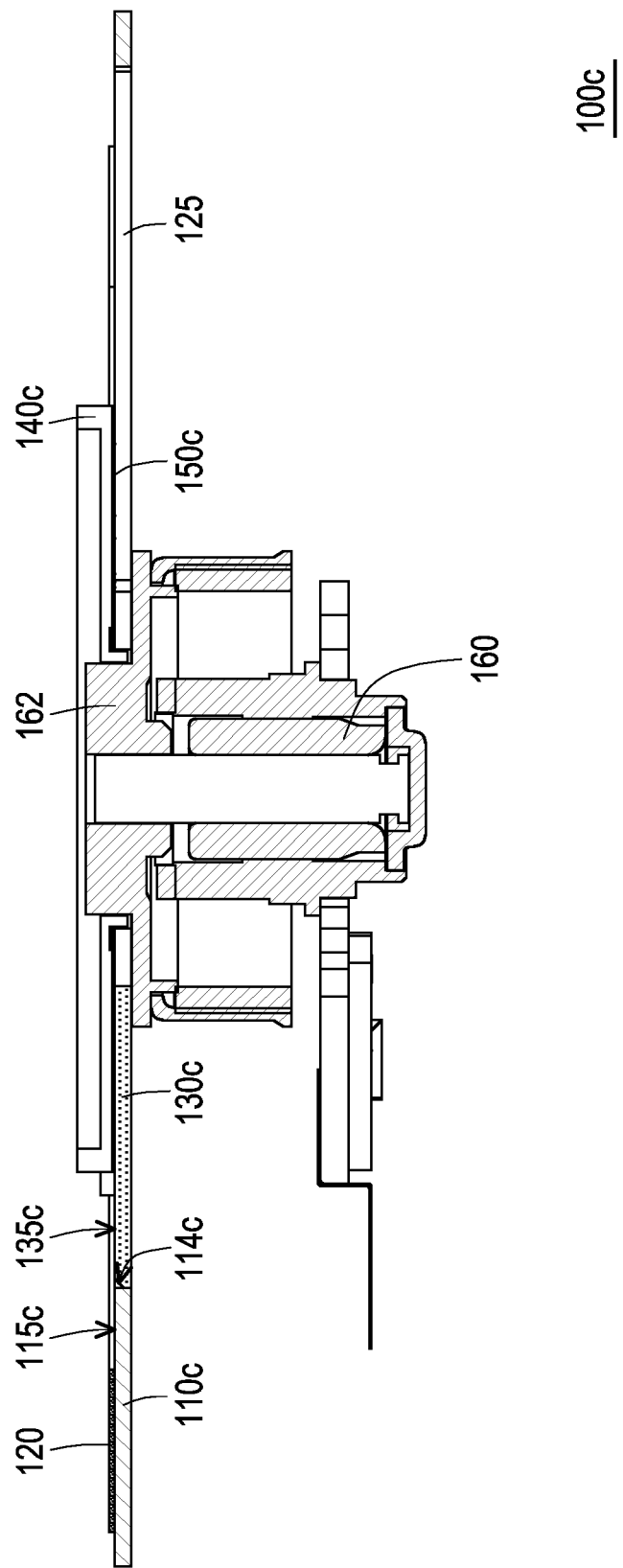
FIG. 4D is a schematic cross-sectional view of the wavelength conversion module of FIG. 4A.

FIG. 4A is a schematic three-dimensional view of a wavelength conversion module according to another embodiment of the invention. FIG. 4B is a schematic three-dimensional exploded view of the wavelength conversion module of FIG. 4A. FIG. 4C is a schematic three-dimensional exploded view of the wavelength conversion module of FIG. 4A from another viewing angle. FIG. 4D is a schematic cross-sectional view of the wavelength conversion module of FIG. 4A. Referring to FIG. 3A and FIG. 4A, a wavelength conversion module 100c of the embodiment is similar to the wavelength conversion module 100b of FIG. 3A, and a difference there between is that in the embodiment, a structure of a wing 130c of a clamping element 140c is different from the structure of the wing 144b of the clamping element 140b of FIG. 3A.

In detail, referring to FIG. 4A, FIG. 4B, FIG. 4C and FIG. 4D at the same time. In the embodiment, a clamping element 140c and three wings 130c are respectively independent components, where a material of the wings 130c is different from a material of the clamping element 140c and a material of the substrate 110c, and the wings 130c are separated and independent from each other. The clamping element 140c is disposed in the non-wavelength conversion area A2 of the substrate 110c and covers a part of the wings 130c. Namely, the wings 130c are assembled downwardly in the through holes 114c from the first surface 115c of the substrate 110c. The clamping element 140c is disposed coaxially with the substrate 110c, and the clamping element 140c is fixed on the substrate 110c through the adhesive layer 150c. A material of the clamping element 140c may be metal, non-metal, or a composite material of metal/non-metal, and may be, for example, formed by curing an aluminum alloy or a colloidal material.

When the substrate 110c reaches the first temperature range, for example, a normal temperature/low temperature, and the temperature is 20 degrees to 90 degrees, the wings 130c are embedded into the through holes 114c of the substrate 110c to close the through holes 114c. At this time, a first surface 115c of the substrate 110c and a second surface 135c of the wings 130c are located on a same plane. When the substrate 110c reaches the second temperature range, for example, a high temperature state, when the temperature is 90° C. to 170° C., since the deformation of the wings 130c is different from that of the substrate 110c, the wings 130c are warped in an opposite direction toward the first surface 115c, and airflow channels are formed between the wings 130c and the through holes 114c of the substrate 110c (referring to FIG. 2F), which may increase the turbulence effect to effectively reduce the temperature of the wavelength conversion module 100c.

Figure 5A:
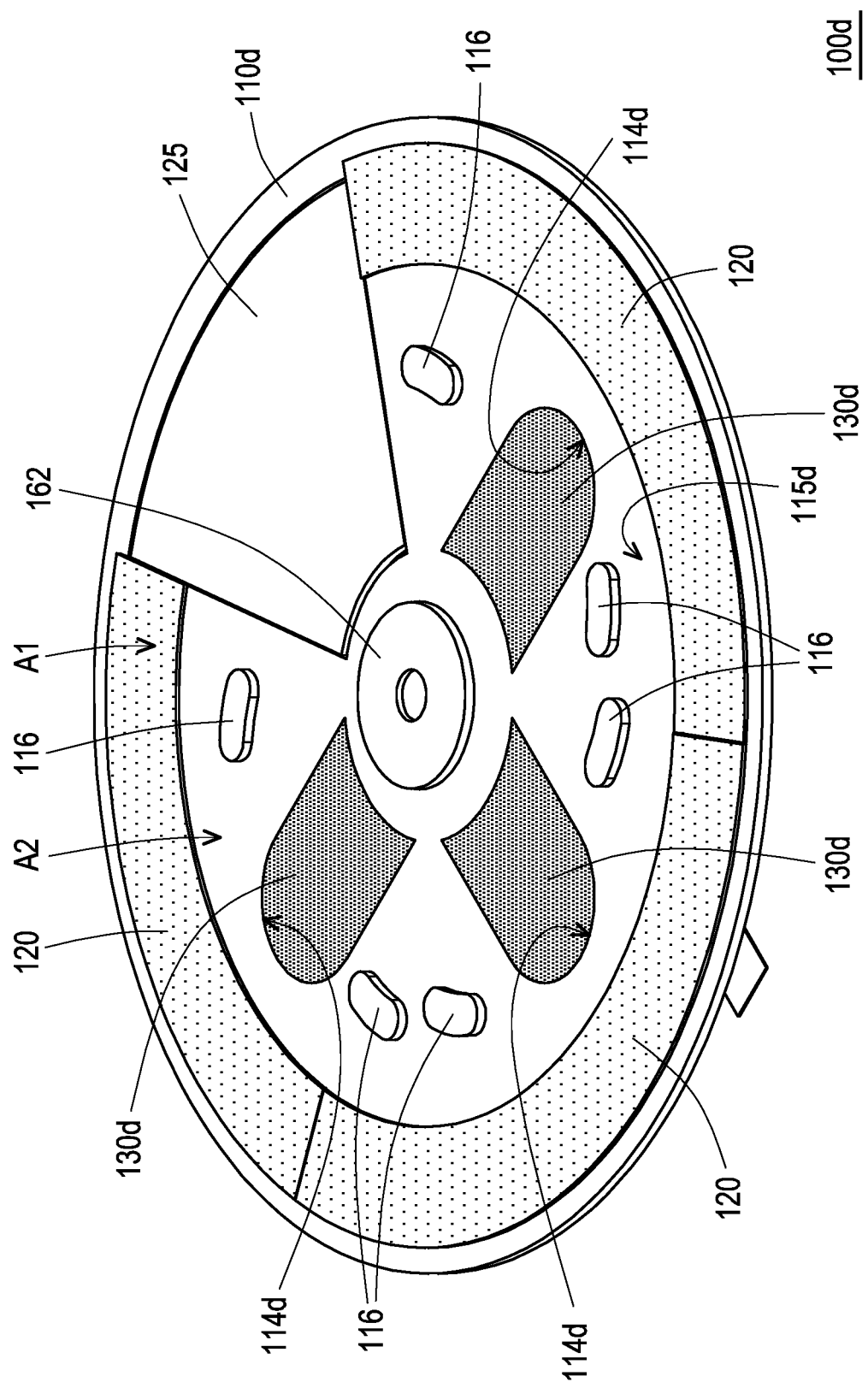
FIG. 5A is a schematic three-dimensional view of a wavelength conversion module according to another embodiment of the invention.
Figure 5B:
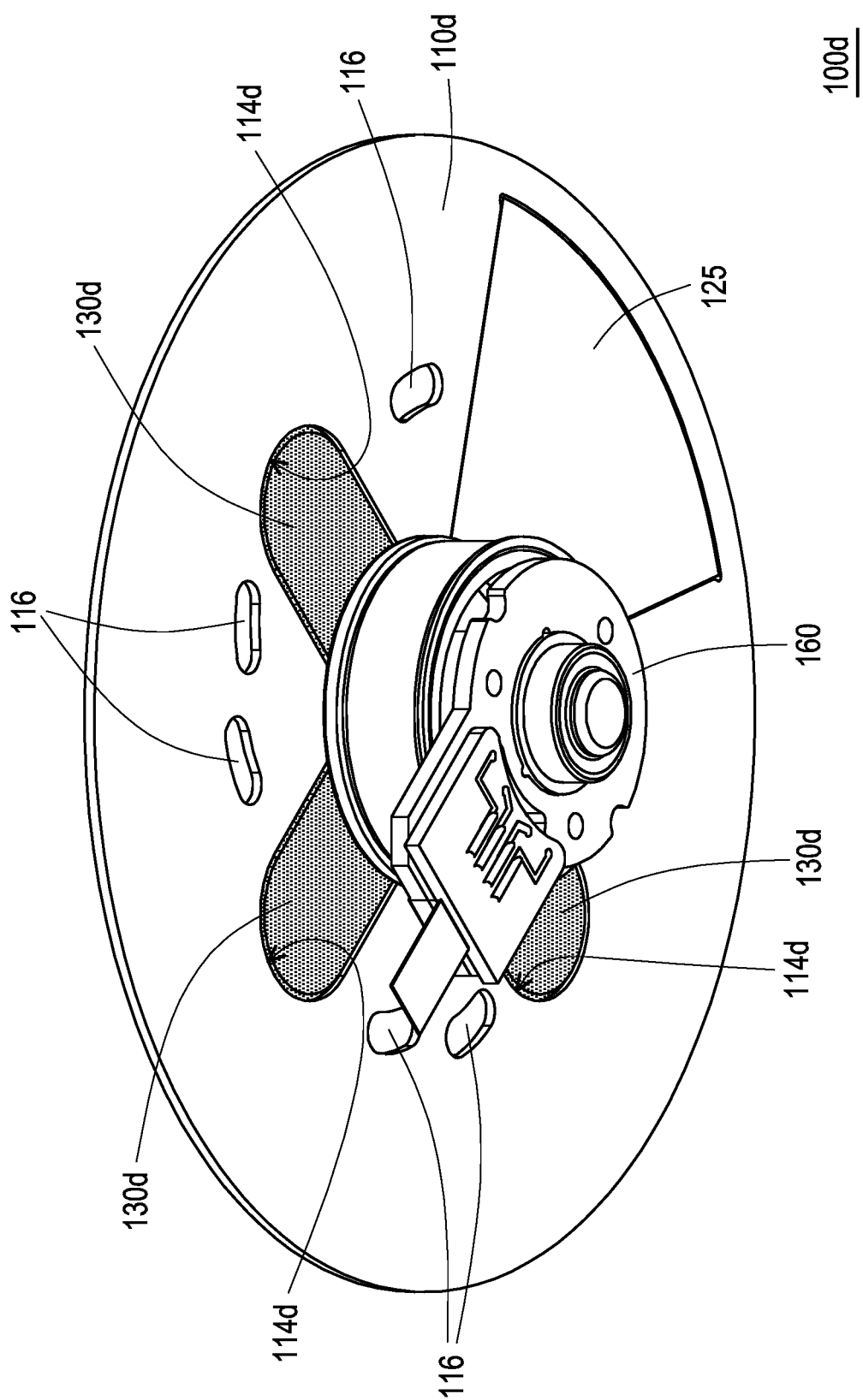
FIG. 5B is a schematic three-dimensional view of the wavelength conversion module of FIG. 5A from another viewing angle.
Figure 5C:
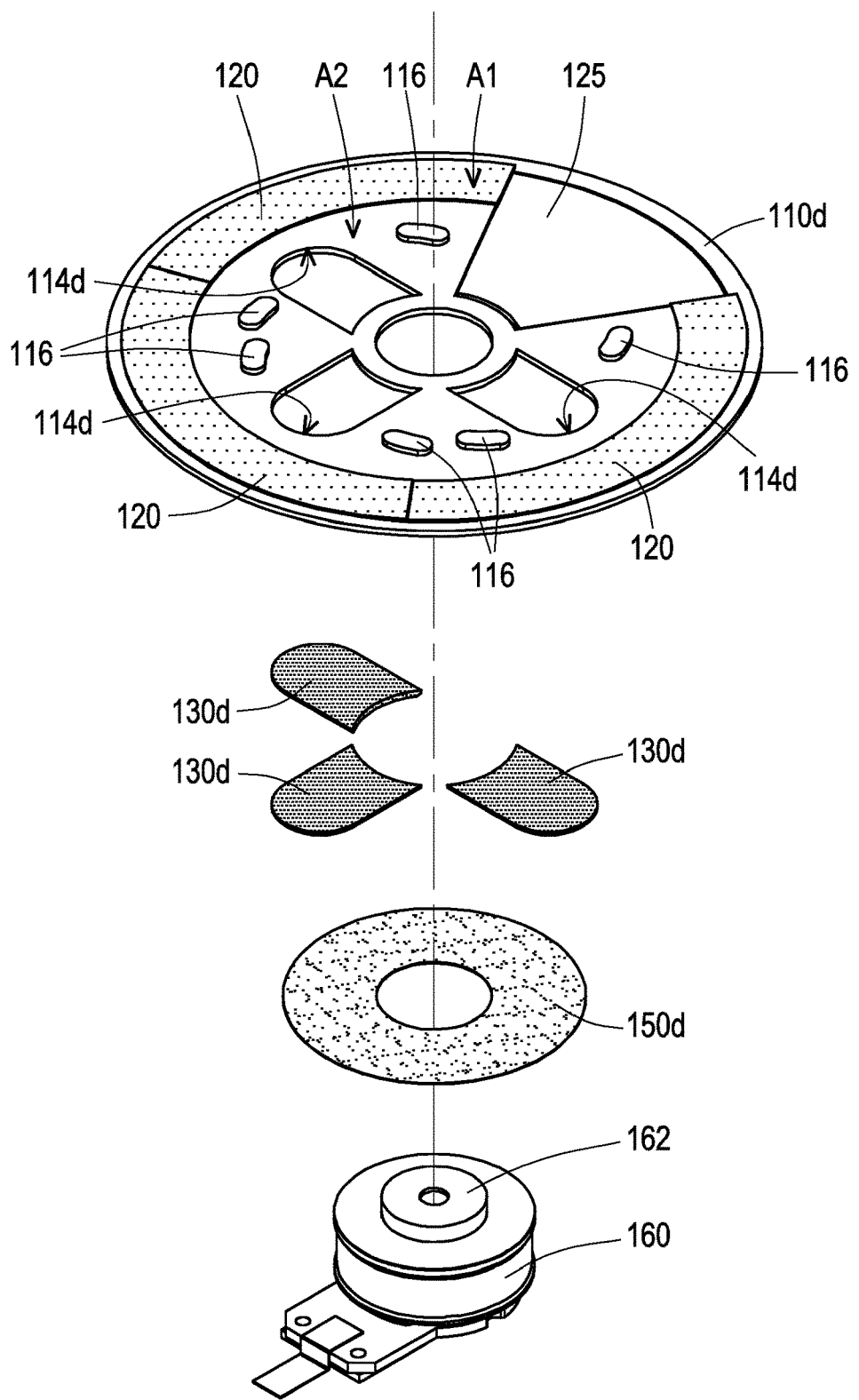
FIG. 5C is a schematic three-dimensional exploded view of the wavelength conversion module of FIG. 5A.
Figure 5D:
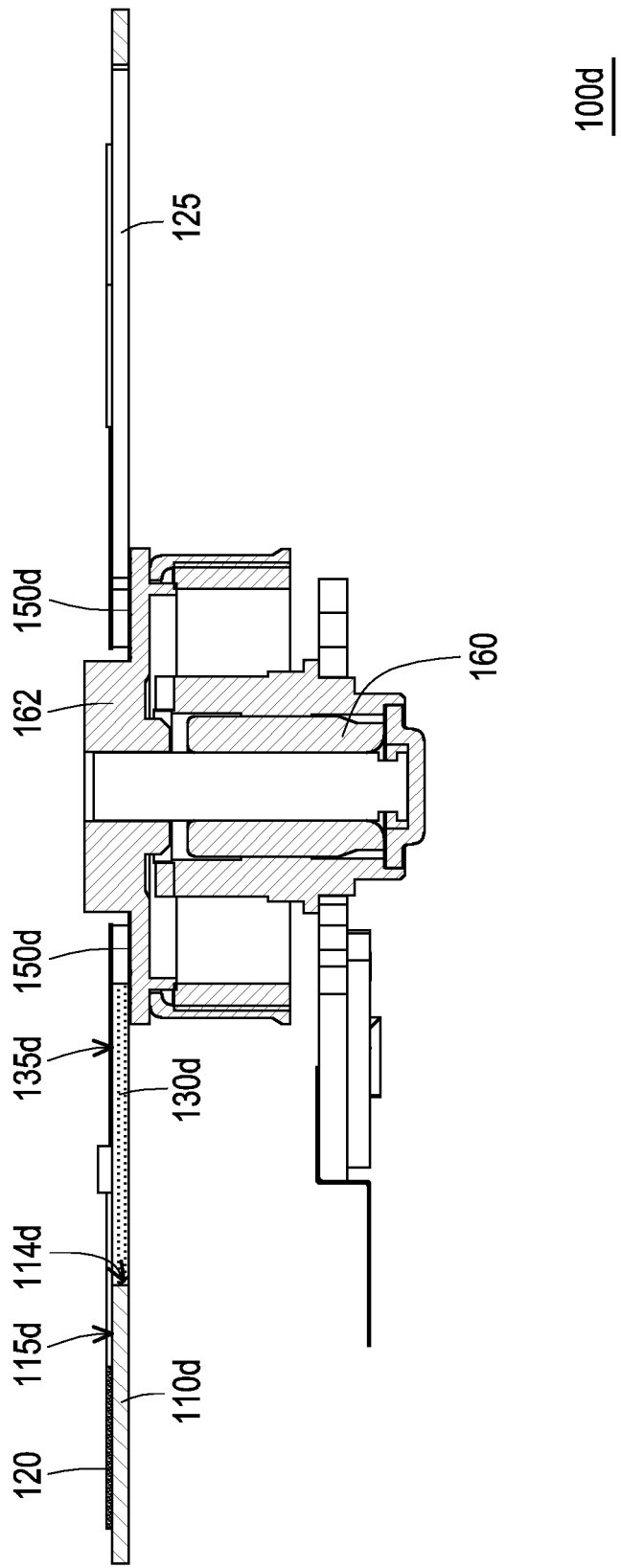
FIG. 5D is a schematic cross-sectional view of the wavelength conversion module of FIG. 5A.

FIG. 5A is a schematic three-dimensional view of a wavelength conversion module according to another embodiment of the invention. FIG. 5B is a schematic three-dimensional view of the wavelength conversion module of FIG. 5A from another viewing angle. FIG. 5C is a schematic three-dimensional exploded view of the wavelength conversion module of FIG. 5A. FIG. 5D is a schematic cross-sectional view of the wavelength conversion module of FIG. 5A. Referring to FIG. 4A and FIG. 5A, a wavelength conversion module 100d of the embodiment is similar to the wavelength conversion module 100c of FIG. 4A, and a difference there between is that in the embodiment, the clamping element 140c of FIG. 4A is not configured, and an assembling direction of a plurality of wings 130d is different from that of the wings 130c of FIG. 4A.

In detail, referring to FIG. 5A, FIG. 5B, FIG. 5C and FIG. 5D, in the embodiment, the wings 130d are embedded into the through holes 114d of the substrate 110d to close the through holes 114d from the side of the substrate 110d adjacent to the driving assembly 160. Namely, the wings 130d are assembled in the through holes 114d from bottom to top. At this time, the rotation shaft 162 of the driving assembly 160 may be regarded as a clamping element. An adhesive layer 150d is disposed between the rotation shaft 162 of the driving assembly 160 and the non-wavelength conversion area A2 of the substrate 110d, where the driving assembly 160 is fixed on the substrate 110d through the adhesive layer 150d. When the substrate 110d reaches the first temperature range, for example, a normal temperature/ low temperature, and the temperature is 20 degrees to 90 degrees, the wings 130d are embedded into the through holes 114d of the substrate 110d to close the through holes 114d. At this time, a first surface 115d of the substrate 110d and a second surface 135d of the wings 130d are on a same plane. When the substrate 110d reaches the second temperature range, such as a high temperature state, and the temperature is 90 degrees to 170 degrees, since the substrate 110d and the wings 130d have different thermal expansions, airflow channels are formed between the wings 130d and the through holes 114d of the substrate 110d (referring to FIG. 2F), which may increase the turbulence effect and effectively reduce the temperature of the wavelength conversion module 100d.

Figure 6A:
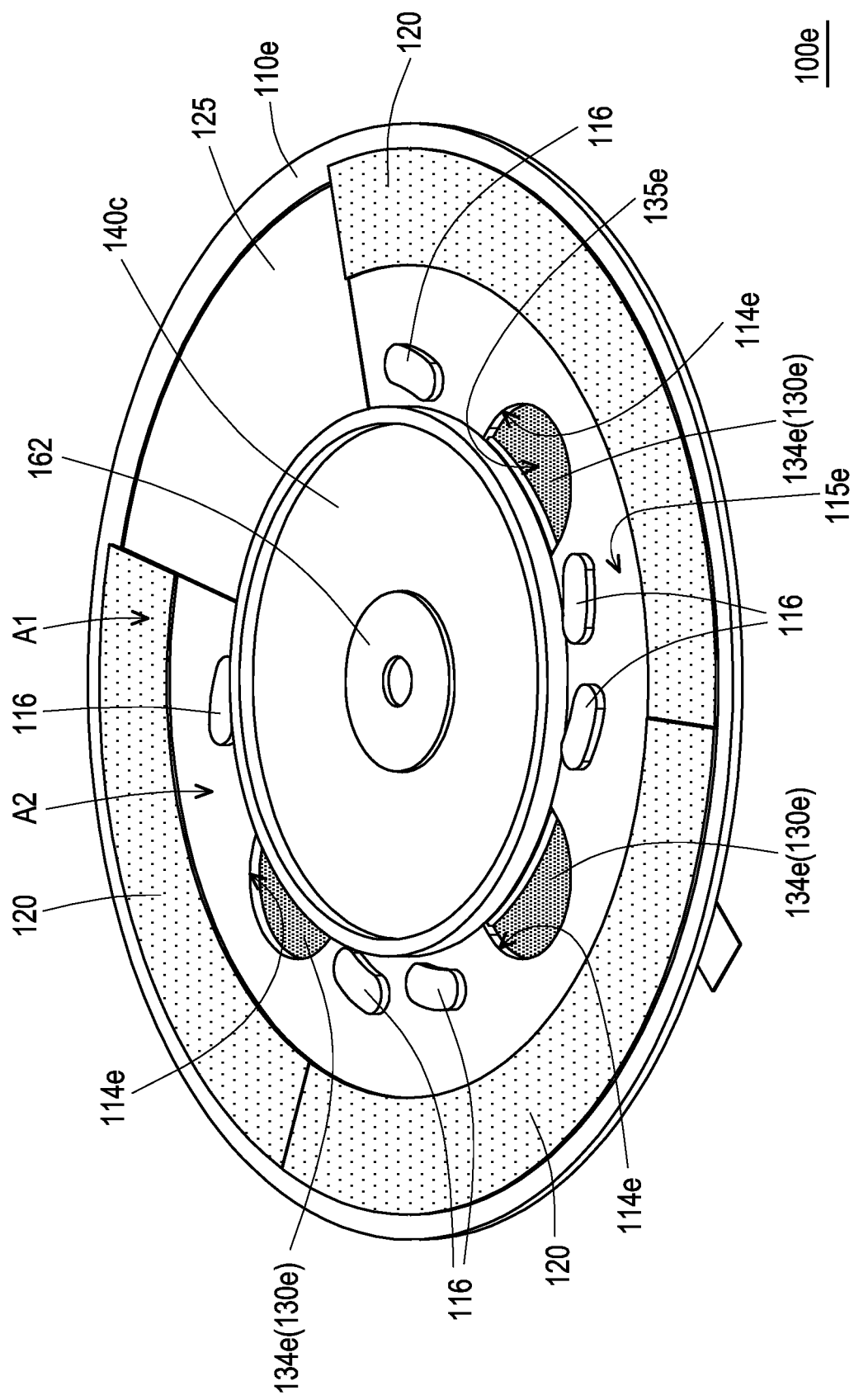
FIG. 6A is a schematic three-dimensional view of a wavelength conversion module according to another embodiment of the invention.
Figure 6B:
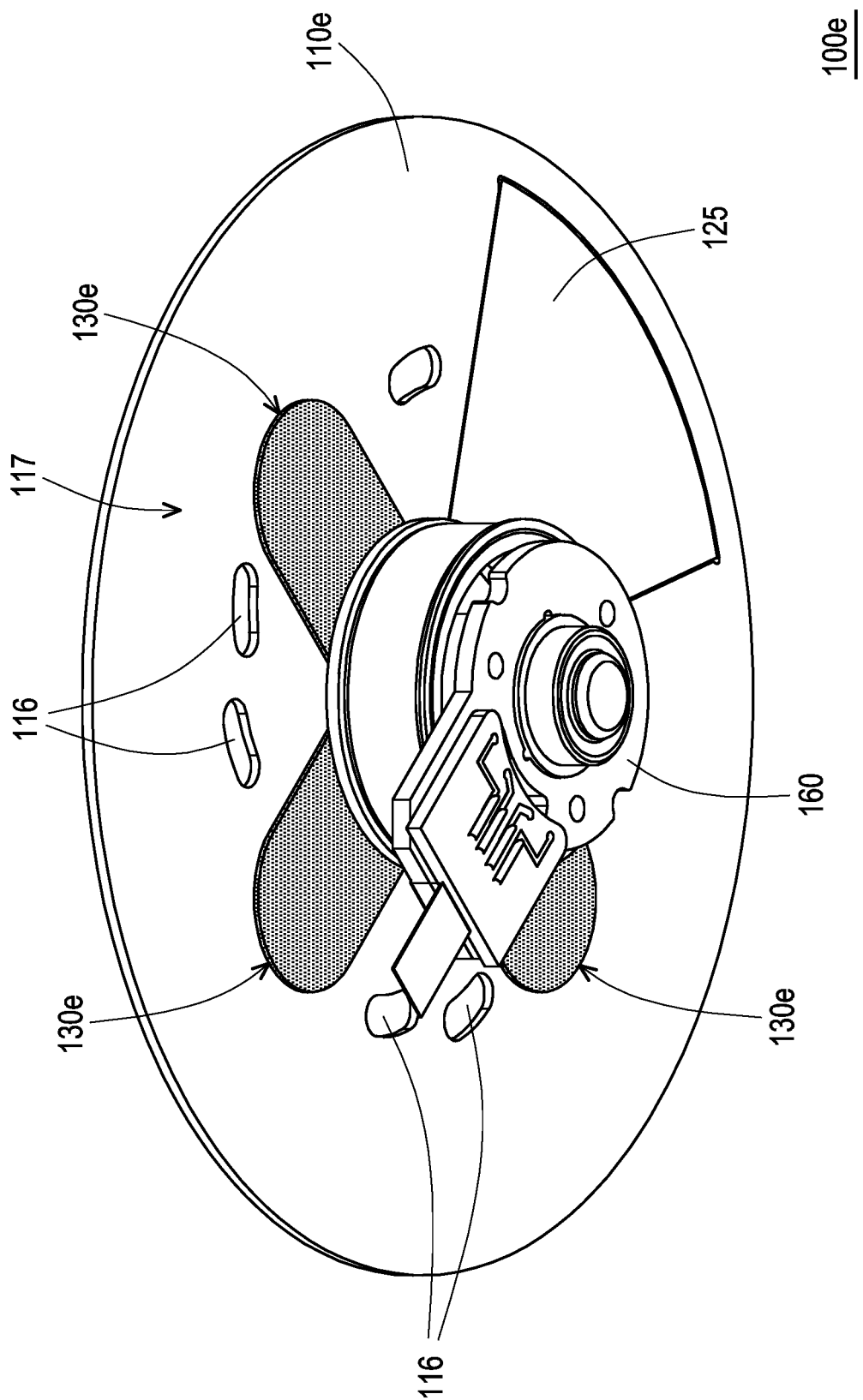
FIG. 6B is a schematic three-dimensional view of the wavelength conversion module of FIG. 6A from another viewing angle.
Figure 6C:
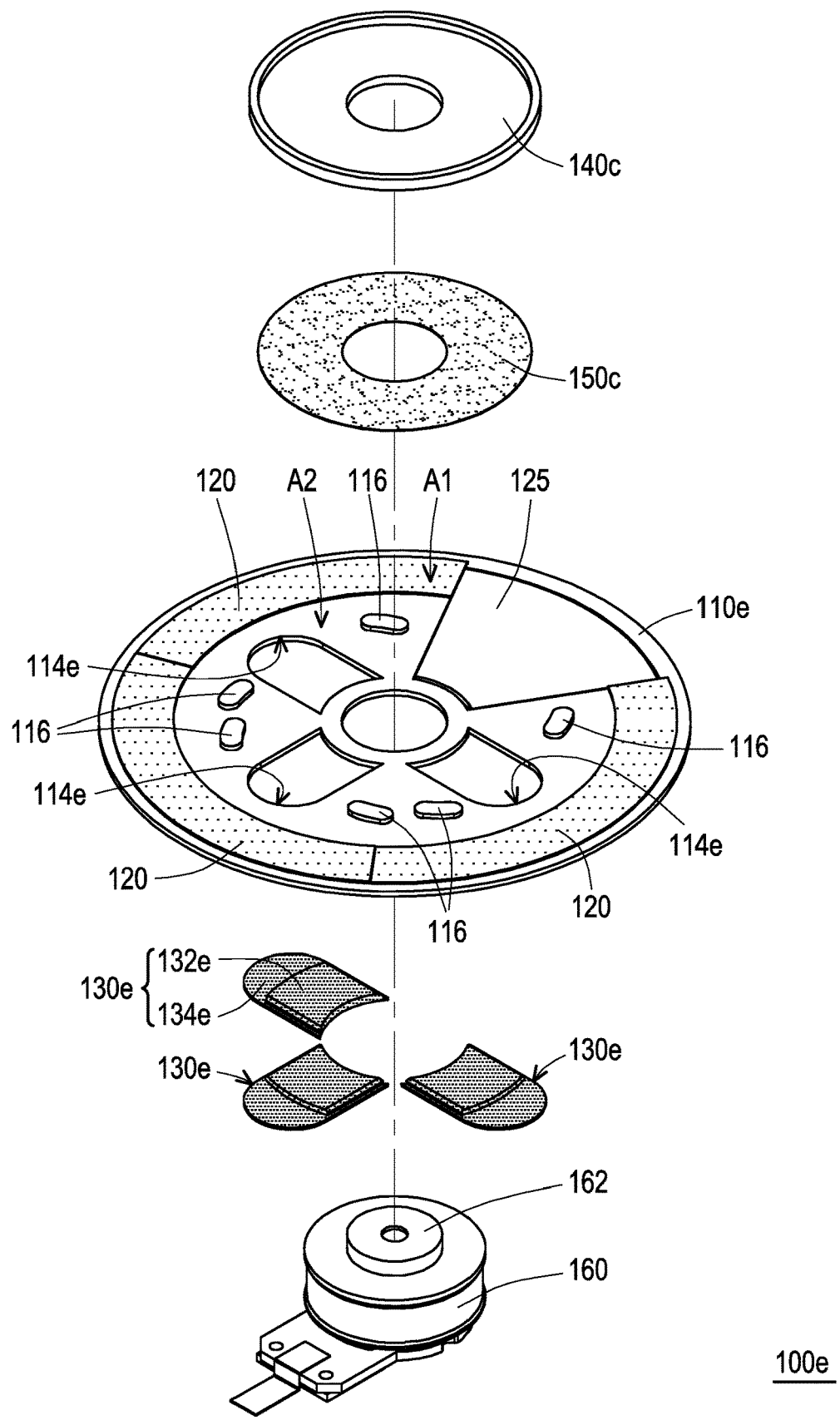
FIG. 6C is a schematic three-dimensional exploded view of the wavelength conversion module of FIG. 6A.
Figure 6D:
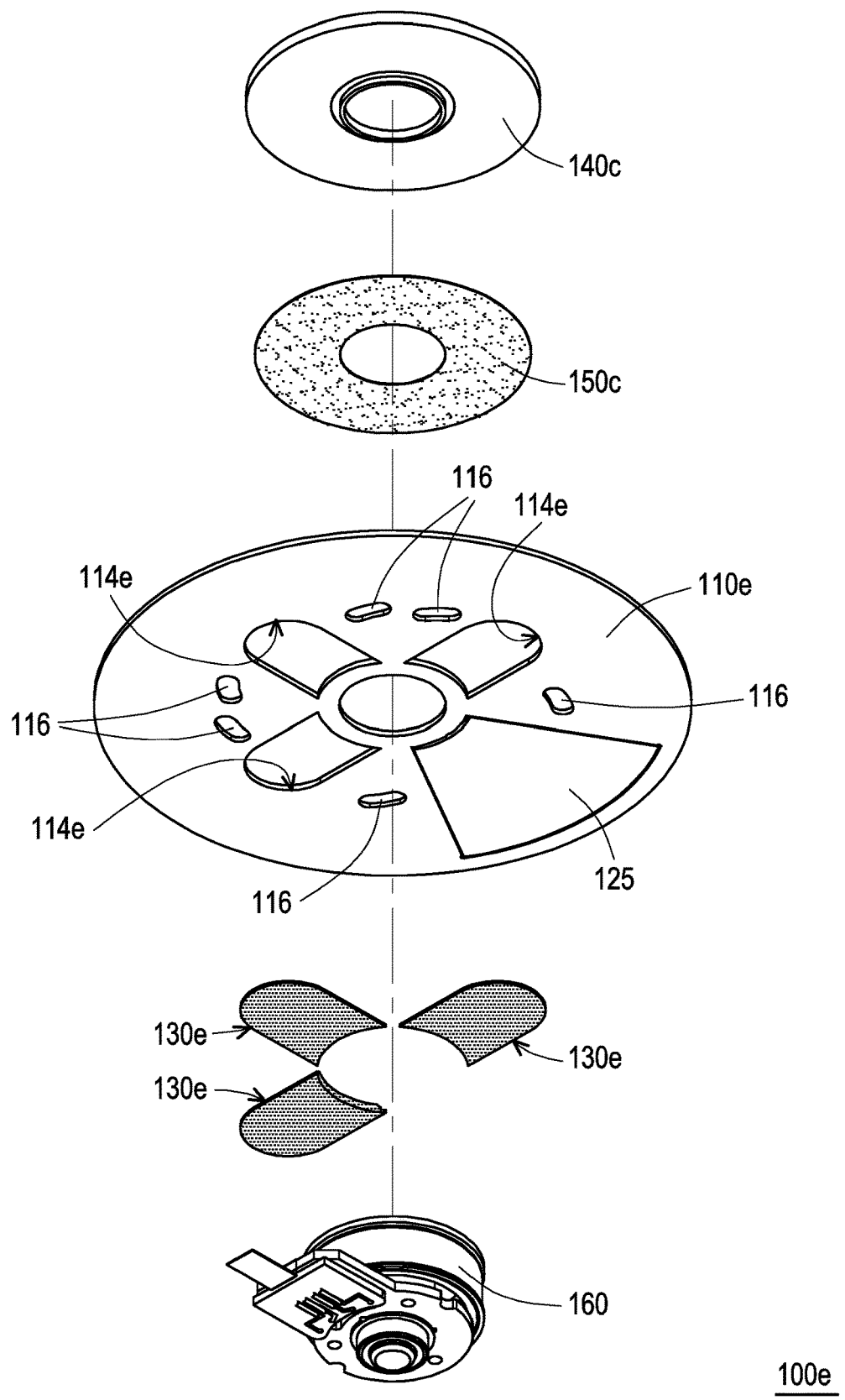
FIG. 6D is a schematic three-dimensional exploded view of the wavelength conversion module of FIG. 6A from another viewing angle.
Figure 6E:
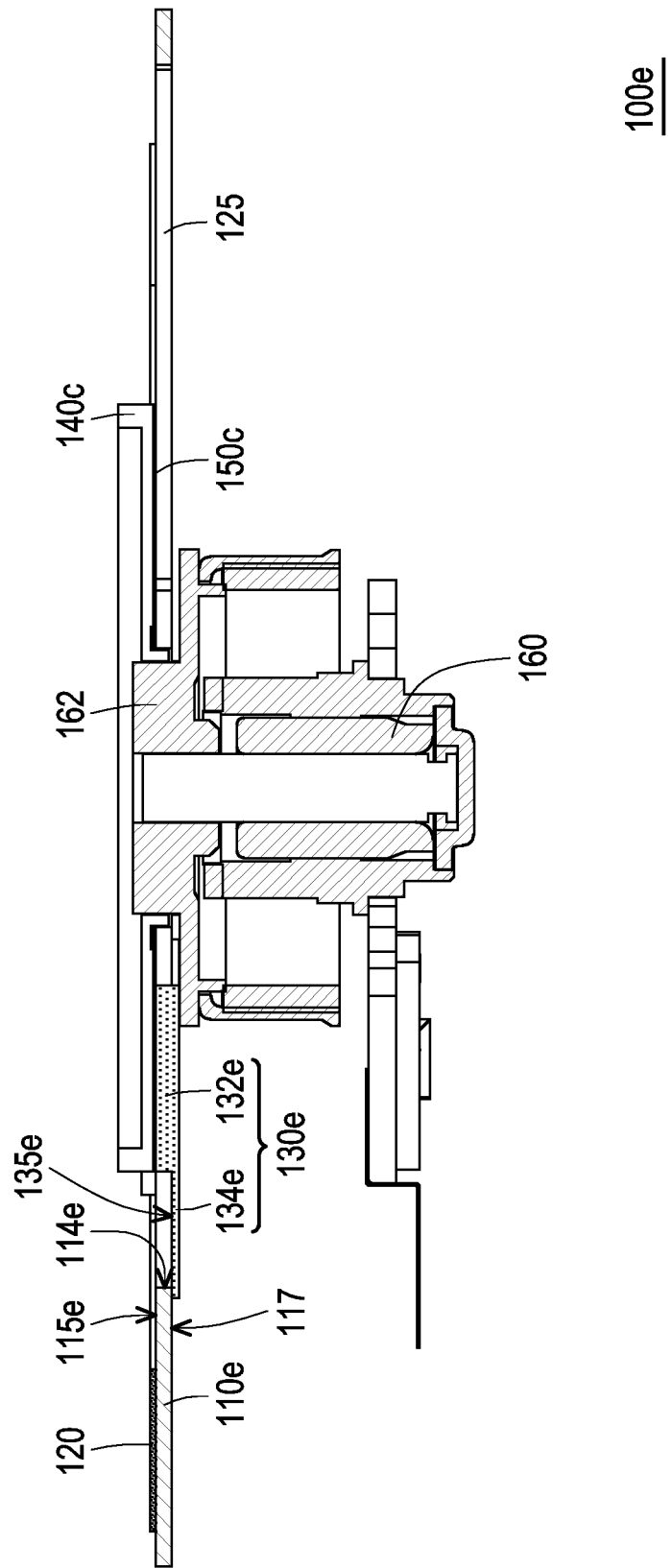
FIG. 6E is a schematic cross-sectional view of the wavelength conversion module of FIG. 6A.

FIG. 6A is a schematic three-dimensional view of a wavelength conversion module according to another embodiment of the invention. FIG. 6B is a schematic three-dimensional view of the wavelength conversion module of FIG. 6A from another viewing angle. FIG. 6C is a schematic three-dimensional exploded view of the wavelength conversion module of FIG. 6A. FIG. 6D is a schematic three-dimensional exploded view of the wavelength conversion module of FIG. 6A from another viewing angle. FIG. 6E is a schematic cross-sectional view of the wavelength conversion module of FIG. 6A. Referring to FIG. 4A and FIG. 6A, a wavelength conversion module 100e of the embodiment is similar to the wavelength conversion module 100c of FIG. 4A, and a difference there between is that in the embodiment, a structure and size of wing 130e are different from the structure and size of the wings 130c of FIG. 4A, and an assembling direction of the wings 130e is different from the assembling direction of the wings 130c of FIG. 4A.

In detail, referring to FIG. 6A, FIG. 6B, FIG. 6C, FIG. 6D and FIG. 6E, in the embodiment, the wing 130e includes a first portion 132e and a second portion 134e, where a thickness of the first portion 132e is greater than a thickness of the second portion 134e. In particular, an area of the wing 130e is larger than an area of a through hole 114e of a substrate 110e, and the wings 130e are on a third surface 117 of the substrate 110e to close the through holes 114e and block airflows. When the substrate 110e reaches the first temperature range, such as a normal temperature/low temperature state, and the temperature is 20 degrees to 90 degrees, the wings 130e cover the through holes 114e of the substrate 110e to close the through holes 114e. At this time, a first surface 115e of the substrate 110e and a second surface 135e of the second portion 134e of the wing 130e are located on different planes. When the substrate 110e reaches the second temperature range, such as a high temperature state, and the temperature is 90 degrees to 170 degrees, since the substrate 110e and the wings 130e have different thermal expansions, airflow channels are formed between the wings 130e and the through holes 114e of the substrate 110e (referring to FIG. 2F), which may increase the turbulence effect and effectively reduce the temperature of the wavelength conversion module 100e.

In brief, in the design of the wavelength conversion modules 100a, 100b, 100c, 100d, 100e of the embodiment, the method that the wings 144a, 144b, 130c, 130d, 130e close the through holes 114a, 114b, 114c, 114d, 114e of the substrates 110a, 110b, 110c, 110d, 110e, may be to partially or completely embedded into or cover the through holes 114a, 114b, 114c, 114d, 114e, and in different temperature ranges, the spaces between the wings 144a, 144b, 130c, 130d, 130e and the through holes 114a, 114b, 114c, 114d, 114e may be dynamically and automatically adjusted, and the noise felt by the user may be reduced under the premise of satisfying the heat dissipation requirement.

In summary, the embodiments of the invention have at least one of following advantages or effects. In the design of the wavelength conversion module of the invention, the wings are disposed in the non-wavelength conversion area of the substrate, where when the substrate reaches the first temperature range (such as a low temperature), the wings close the through holes, and when the substrate reaches the second temperature range (such as a high temperature), airflow channels are formed between the wings and the through holes. In other words, the airflow channels formed between the wings and the through holes increase a turbulence effect, so as to effectively reduce a temperature of the wavelength conversion module to make the wavelength conversion module achieving better reliability. Moreover, since the wavelength conversion module of the invention may dynamically and automatically adjust spaces between the wings and the through holes in different temperature ranges, the noise felt by the user may be reduced under the premise of satisfying a heat dissipation requirement. In addition, the projection device using the wavelength conversion module of the invention may have better projection quality and product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising:
    a substrate, having a wavelength conversion area, a non-wavelength conversion area and at least one through hole, wherein the at least one through hole penetrates through the substrate and is located in the non-wavelength conversion area;
    a wavelength conversion layer, disposed in the wavelength conversion area of the substrate; and
    at least one wing, disposed in the non-wavelength conversion area of the substrate, wherein
    when the substrate reaches a first temperature range, the at least one wing closes the at least one through hole, and
    when the substrate reaches a second temperature range, at least one airflow channel is formed between the at least one wing and the at least one through hole.

2. The wavelength conversion module as claimed in claim 1, wherein a thermal expansion coefficient of the at least one wing is different from a thermal expansion coefficient of the substrate.

3. The wavelength conversion module as claimed in claim 2, wherein the thermal expansion coefficient of the at least one wing is less than the thermal expansion coefficient of the substrate.

4. The wavelength conversion module as claimed in claim 1, further comprising:
    a clamping element, comprising a main body and the at least one wing formed integrally, the at least one wing being located on one side surface of the main body and extending out of the main body, wherein the at least one wing is embedded into the at least one through hole to close the at least one through hole.

5. The wavelength conversion module as claimed in claim 4, wherein the substrate has a first surface, the at least one wing has a second surface, and the first surface and the second surface are located on a same plane.

6. The wavelength conversion module as claimed in claim 4, wherein the at least one through hole is a plurality of through holes, and the plurality of through holes are communicated with each other, the at least one wing is a plurality of wings, and the plurality of wings respectively extend out of the main body along different radial directions of the main body, and the plurality of wings are connected with each other.

7. The wavelength conversion module as claimed in claim 4, further comprising:
    an adhesive layer, disposed between the main body of the clamping element and the non-wavelength conversion area of the substrate, wherein the clamping element is fixed on the substrate through the adhesive layer.

8. The wavelength conversion module as claimed in claim 1, further comprising:
    a clamping element, comprising a main body and the at least one wing formed integrally, the at least one wing is connected to an edge of the main body, and the at least one wing and the main body are located on different planes, wherein the at least one wing is embedded into the at least one through hole to close the at least one through hole.

9. The wavelength conversion module as claimed in claim 8, wherein the substrate has a first surface, the at least one wing has a second surface, and the first surface and the second surface are located on a same plane.

10. The wavelength conversion module as claimed in claim 8, wherein the at least one through hole is a plurality of through holes, and the plurality of through holes are separated from each other, the at least one wing is a plurality of wings, and the plurality of wings respectively extend along different radial directions of the main body, and the plurality of wings are separated from each other.

11. The wavelength conversion module as claimed in claim 8, further comprising:
    an adhesive layer, disposed between the main body of the clamping element and the non-wavelength conversion area of the substrate, wherein the clamping element is fixed on the substrate through the adhesive layer.

12. The wavelength conversion module as claimed in claim 1, further comprising:
    a clamping element, disposed in the non-wavelength conversion area of the substrate and covering a part of the at least one wing, the clamping element and the substrate being coaxially arranged; and
    an adhesive layer, disposed between the clamping element and the non-wavelength conversion area of the substrate, wherein the clamping element is fixed on the substrate through the adhesive layer.

13. The wavelength conversion module as claimed in claim 12, wherein a material of the at least one wing is different from a material of the clamping element and a material of the substrate.

14. The wavelength conversion module as claimed in claim 1, further comprising:
    a driving assembly, connected to the substrate, and driving the substrate to rotate while taking a rotation shaft of the driving assembly as a central axis, wherein the at least one wing is embedded into the at least one through hole from one side of the substrate relatively adjacent to the driving assembly to close the at least one through hole; and
    an adhesive layer, disposed between the rotation shaft of the driving assembly and the non-wavelength conversion area of the substrate, wherein the driving assembly is fixed on the substrate through the adhesive layer.

15. The wavelength conversion module as claimed in claim 1, wherein the substrate has a first surface, the at least one wing has a second surface, and the first surface and the second surface are located on different planes, and the at least one wing covers the at least one through hole to close the at least one through hole.

16. The wavelength conversion module as claimed in claim 15, wherein an area of the at least one wing is larger than an area of the at least one through hole.

17. The wavelength conversion module as claimed in claim 1, wherein the substrate comprises a plurality of turbulent portions protruding out of or recessed into the non-wavelength conversion area.

18. The wavelength conversion module as claimed in claim 1, wherein a material of the at least one wing comprises metal, non-metal or a composite material of metal and non-metal.

19. The wavelength conversion module as claimed in claim 1, wherein a material of the substrate comprises metal, non-metal or a composite material of metal and non-metal.

20. A projection device, comprising:
an illumination system, configured to provide an illumination light beam, the illumination system comprising:
a light source module, configured to provide an excitation light beam; and
a wavelength conversion module, disposed on a transmission path of the excitation light beam to convert the excitation light beam into an illumination light beam, the wavelength conversion module comprising:
a substrate, having a wavelength conversion area, a non-wavelength conversion area and at least one through hole, wherein the through hole penetrates through the substrate and is located in the non-wavelength conversion area;
a wavelength conversion layer, disposed in the wavelength conversion area of the substrate; and
at least one wing, disposed in the non-wavelength conversion area of the substrate, wherein
when the substrate reaches a first temperature range, the at least one wing closes the at least one through hole and
when the substrate reaches a second temperature range, at least one airflow channel is formed between the at least one wing and the at least one through hole;
a light valve, disposed on the transmission path of the illumination light beam to convert the illumination light beam into an image light beam; and
a projection lens, disposed on a transmission path of the image light beam to project the image light beam out of the projection device.

* * * * *